United States Patent
Liensberger et al.

(10) Patent No.: US 10,796,216 B2
(45) Date of Patent: Oct. 6, 2020

(54) CONTEXT-AWARE DIGITAL PERSONAL ASSISTANT SUPPORTING MULTIPLE ACCOUNTS

(71) Applicant: Microsoft Technology Licensing, LLC, Redmond, WA (US)

(72) Inventors: Christian Liensberger, Bellevue, WA (US); Varsha Mahadevan, Sammamish, WA (US); Jonathan E. Hamaker, Issaquah, WA (US); Michael D. Plumpe, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 15/143,420

(22) Filed: Apr. 29, 2016

(65) Prior Publication Data
US 2017/0316305 A1    Nov. 2, 2017

(51) Int. Cl.
*G06N 3/00* (2006.01)
*G06F 16/2457* (2019.01)
(Continued)

(52) U.S. Cl.
CPC ....... *G06N 3/006* (2013.01); *G06F 16/24578* (2019.01); *H04L 65/4069* (2013.01); *H04L 65/601* (2013.01); *H04L 67/306* (2013.01)

(58) Field of Classification Search
CPC . G06N 3/006; G06F 17/3053; H04L 65/4069; H04L 65/601; H04L 67/306
(Continued)

(56) References Cited

U.S. PATENT DOCUMENTS 6,757,362 B1    6/2004  Cooper et al.
6,792,082 B1    9/2004  Levine
(Continued)

FOREIGN PATENT DOCUMENTS

| EP | 2530920 A1 | 12/2012 |
|----|------------|---------|
| WO | 2003073417 A2 | 9/2003 |
| WO | 2014093339 A1 | 6/2014 |

OTHER PUBLICATIONS

"Sympatico™Personal Account Information", Published on: Oct. 21, 2012, 54 pages, Available at: http://support.bell.ca/_web/Internet/Guides/6520_6300_UserGuide_Sympatico_EN.pdf.
(Continued)

*Primary Examiner* — James E Springer
(74) *Attorney, Agent, or Firm* — Wade IP Law LLC

(57) ABSTRACT

Techniques are described herein that are capable of implementing a context-aware digital personal assistant (DPA) that supports multiple accounts and/or facilitating interaction among digital personal assistants. For example, a user may be signed-in with accounts of a DPA. Content from content streams associated with the respective accounts may be selectively combined based on at least the user's context. In another example, users who are signed-in with accounts of a DPA may share a user experience provided by the DPA. Content from content streams associated with the respective accounts may be selectively combined based on at least one or more of the users' context. In yet another example, a first DPA associated with a first user may be caused to perform an operation on behalf of a second DPA associated with a second user or to delegate the operation to the second DPA.

23 Claims, 14 Drawing Sheets

(51) Int. Cl.
*H04L 29/06* (2006.01)
*H04L 29/08* (2006.01)
(58) Field of Classification Search
USPC .......................................................... 709/231
See application file for complete search history.

(56) References Cited

U.S. PATENT DOCUMENTS

| | | | |
|---|---|---|---|
| 8,457,299 B2 | 6/2013 | Miller et al. | |
| 9,176,945 B1 | 11/2015 | Berner et al. | |
| 9,483,529 B1* | 11/2016 | Pasoi | H04L 51/32 |
| 2004/0064567 A1* | 4/2004 | Doss | G06Q 10/06311 |
| | | | 709/228 |
| 2005/0039136 A1 | 2/2005 | Othmer | |
| 2006/0073812 A1* | 4/2006 | Punaganti Venkata | |
| | | | H04L 67/26 |
| | | | 455/412.1 |
| 2007/0043687 A1 | 2/2007 | Bodart et al. | |
| 2007/0162517 A1* | 7/2007 | Teegan | G06F 17/30569 |
| 2007/0192683 A1 | 8/2007 | Bodin et al. | |
| 2008/0091796 A1* | 4/2008 | Story | G06Q 30/0283 |
| | | | 709/217 |
| 2010/0063969 A1* | 3/2010 | Kasargod | G06Q 30/02 |
| | | | 707/740 |
| 2010/0241755 A1* | 9/2010 | Bassett | G06Q 10/06 |
| | | | 709/229 |
| 2011/0184943 A1* | 7/2011 | Norton | G06Q 10/02 |
| | | | 707/723 |
| 2011/0320273 A1* | 12/2011 | Miranda-Steiner | G06Q 30/02 |
| | | | 705/14.49 |
| 2012/0265814 A1 | 10/2012 | Roussis | |
| 2012/0296919 A1* | 11/2012 | Sinha | H04L 67/22 |
| | | | 707/749 |
| 2013/0074167 A1* | 3/2013 | Bailey | G06F 21/41 |
| | | | 726/6 |
| 2013/0110978 A1* | 5/2013 | Gordon | H04N 21/2665 |
| | | | 709/218 |
| 2013/0173808 A1 | 7/2013 | Yoon et al. | |
| 2013/0290905 A1* | 10/2013 | LuVogt | G06N 3/006 |
| | | | 715/835 |
| 2014/0123164 A1* | 5/2014 | Inkumsah | H04N 21/251 |
| | | | 725/14 |
| 2014/0229182 A1* | 8/2014 | Noble | G10L 13/027 |
| | | | 704/270 |
| 2014/0267577 A1 | 9/2014 | Weber et al. | |
| 2014/0365513 A1* | 12/2014 | Aftab | G06F 17/30867 |
| | | | 707/754 |
| 2015/0004945 A1* | 1/2015 | Steeves | H04W 4/12 |
| | | | 455/412.2 |
| 2015/0066817 A1 | 3/2015 | Slayton et al. | |
| 2015/0249660 A1* | 9/2015 | Bailey | G06F 21/41 |
| | | | 726/8 |
| 2015/0294275 A1* | 10/2015 | Richardson | G06T 19/00 |
| | | | 705/7.18 |
| 2015/0309768 A1* | 10/2015 | van der Heide | G06F 16/437 |
| | | | 700/94 |
| 2015/0349556 A1* | 12/2015 | Mercando | H04M 1/7253 |
| | | | 455/573 |
| 2016/0086581 A1* | 3/2016 | Khoury | G09G 5/14 |
| | | | 345/1.2 |
| 2016/0112426 A1* | 4/2016 | Nguyen | H04L 63/08 |
| | | | 726/4 |
| 2016/0142382 A1* | 5/2016 | Ziebell | H04L 63/0428 |
| | | | 713/168 |
| 2016/0315986 A1* | 10/2016 | Chen | H04L 65/60 |
| 2016/0321570 A1* | 11/2016 | Engle | H04N 21/2665 |
| 2017/0201779 A1* | 7/2017 | Publicover | H04W 4/21 |
| 2017/0257354 A9* | 9/2017 | Vernal | G06F 21/41 |
| 2017/0316305 A1* | 11/2017 | Liensberger | G06F 17/3053 |
| 2018/0023957 A1* | 1/2018 | Forstall | G01C 21/3453 |
| 2018/0367850 A1* | 12/2018 | Kageyama | H04N 21/482 |

OTHER PUBLICATIONS

"Virtual Assistant Personal Services", Retrieved on: Feb. 11, 2016, 4 pages, Available at: http://www.bigbrothergossip.net/virtual-assistant-personal-services/.

Fitchard, Kevin, "Siri-creator SRI has a new virtual assistant spinoff, this one focusing on the calendar", Published on: Feb. 13, 2013, 4 pages, Available at: http://gigaom.com/2013/02/13/siri-creator-sri-has-a-new-virtual-assistant-spinoff-this-one-focusing-on-the-calendar/.

D'Orazio, Dante, "Apple reportedly buys Cue intelligent personal assistant app", Published on: Oct. 3, 2013, 2 pages, Available at: http://www.theverge.com/2013/10/3/4799754/apple-reportedly-buys-cue-personal-assistant-app.

"International Search Report and Written Opinion Issued in PCT Application No. PCT/US2017/027852", dated Sep. 20, 2017, 12 Pages.

* cited by examiner

CONTEXT-AWARE DIGITAL PERSONAL ASSISTANT SUPPORTING MULTIPLE ACCOUNTS

BACKGROUND

It has become relatively common for devices, such as laptop computers, tablet computers, personal digital assistants (PDAs), and cell phones, to have digital personal assistant functionality. A digital personal assistant is a representation of an entity that interacts with a user of a device. For instance, the digital personal assistant may answer questions that are asked by the user or perform tasks based on instructions from the user. One example of a digital personal assistant is Siri®, which was initially developed by Siri, Inc. and has since been further developed and maintained by Apple Inc. Another example of a digital personal assistant is Cortana®, which is developed and maintained by Microsoft Corporation. A digital personal assistant typically maintains an account for a user so that the digital personal assistant can use information associated with the account to facilitate interaction with the user. However, interaction of a digital personal assistant traditionally is limited to a single user using a single account.

SUMMARY

Various approaches are described herein for, among other things, implementing a context-aware digital personal assistant that supports multiple accounts and/or facilitating interaction among digital personal assistants. A context-aware digital personal assistant is a digital personal assistant that is capable of being aware of context (e.g., context of a user). For instance, the context-aware digital personal assistant may determine the context based on any one or more suitable factors. Examples of such a factor include but are not limited to a location, voice signals, an interaction pattern, a scheduled event, a communication (e.g., email, text message, short message service (SMS) message, and/or social update), network information, a device on which the digital personal assistant is used, an application and/or service that is connected to the device, and one or more people with whom a user interacts.

In a first example approach, a determination is made that a user is signed-in with accounts of a digital personal assistant. Content from content streams that are associated with the respective accounts is selectively combined based on at least a context of the user to generate a selectively combined content stream. The digital personal assistant is caused to provide the selectively combined content stream for presentation to the user.

In a second example approach, a determination is made that users who are signed-in with accounts of a digital personal assistant share a shared user experience provided by the digital personal assistant. Content from content streams that are associated with the respective accounts is selectively combined based on at least a context of one or more of the users to generate a selectively combined content stream. The digital personal assistant is caused to provide the selectively combined content stream for presentation to the users in the shared user experience.

In a third example approach, a determination is made that a first digital personal assistant associated with a first user is authorized to perform an operation on behalf of a second digital personal assistant associated with a second user. The first digital personal assistant is caused to perform the operation on behalf of the second digital personal assistant.

In a fourth example approach, a determination is made that a first digital personal assistant associated with a first user is authorized to delegate an operation to a second digital personal assistant associated with a second user. The first digital personal assistant is caused to delegate the operation to the second digital personal assistant.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
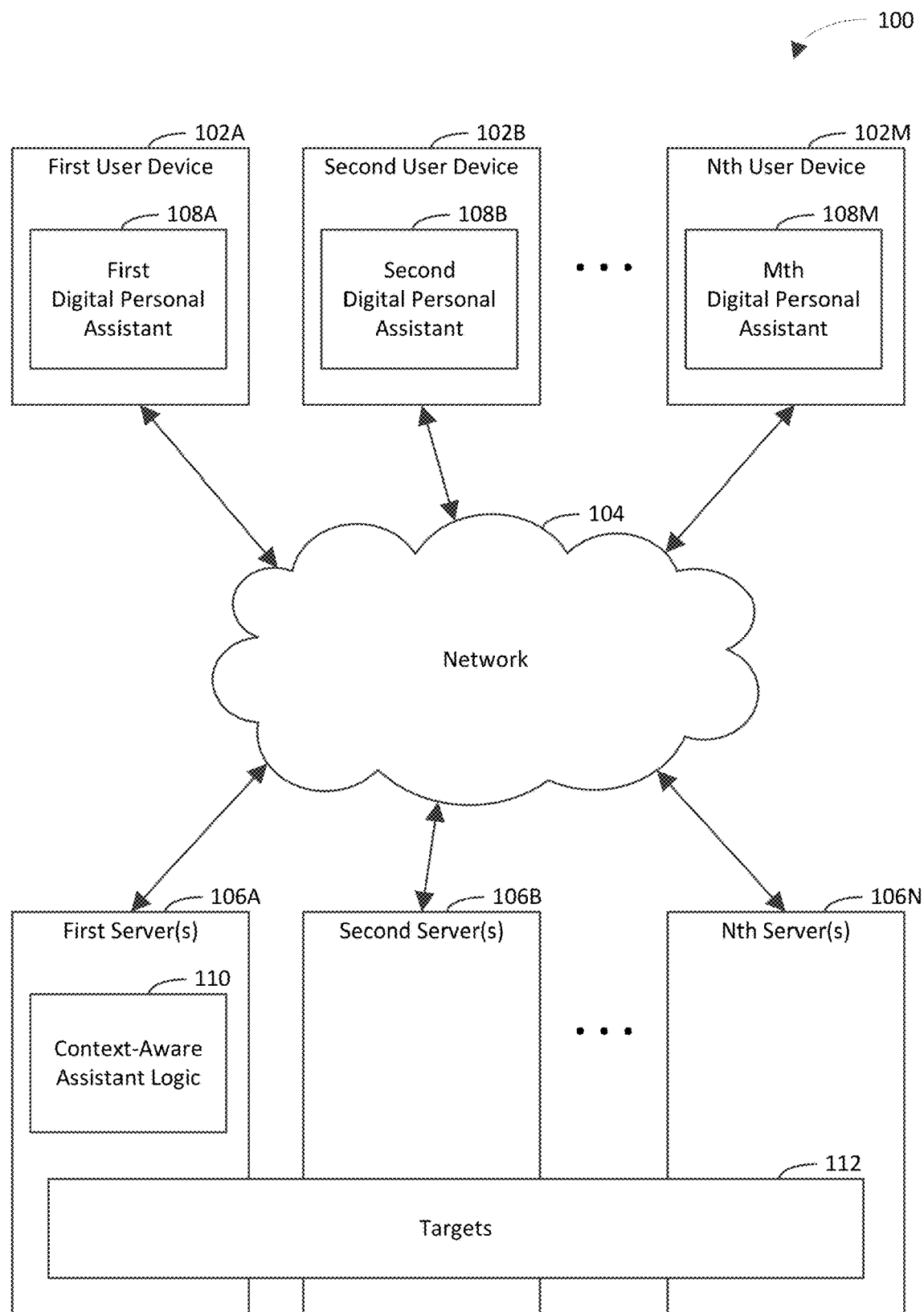
FIG. 1 is a block diagram of an example context-aware assistant system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of implementing a context-aware digital personal assistant that supports multiple accounts (e.g., identities) and/or facilitating interaction among digital personal assistants. A context-aware digital personal assistant is a digital personal assistant that is capable of being aware of context (e.g., context of a user). For instance, the context-aware digital personal assistant may determine the context based on any one or more suitable factors. Examples of such a factor include but are not limited to location, voice signals, interaction patterns, scheduled events, communications (e.g., emails, text messages, SMS messages, and/or social updates), network information, a device on which the digital personal assistant is used, applications and/or services that are connected to the device, and people with whom a user interacts.

Example techniques described herein have a variety of benefits as compared to conventional techniques for implementing a digital personal assistant. For instance, the example techniques may be capable of selectively combining content associated with various accounts of a digital personal assistant to provide a consolidated user experience. For example, a user may be signed-in with multiple accounts of a digital personal assistant. The example techniques may be capable of selectively combining content from the multiple accounts based on a context of the user to provide a selectively combined content stream for presentation (e.g., visually, audibly, and/or tactually) to the user via the digital personal assistant. In another example, multiple users may be signed-in with at least multiple respective accounts of the digital personal assistant. The example techniques may be capable of selectively combining content from the multiple accounts based on a context of one or more of the users to provide a selectively combined content stream for presentation to the users via the digital personal assistant. In yet another example, a first digital personal assistant may be authorized to perform an operation on behalf of a second digital personal assistant. The example techniques may be capable of causing the first digital personal assistant to perform the operation on behalf of the second digital personal assistant. In still another example, a first digital personal assistant may be authorized to delegate an operation to a second digital personal assistant. The example techniques may be capable of causing the first digital personal assistant to delegate the operation to the second digital personal assistant.

The example techniques may be capable of selectively combining content from multiple work accounts and/or multiple personal accounts to generate a selectively combined content stream for presentation via the digital personal assistant. The example techniques may be capable of identifying which user is interacting with the digital personal assistant and tailoring which content is selected for inclusion in a selectively combined content stream that is to be presented via the digital personal assistant so that the selected content corresponds to the identified user. The example techniques may be capable of enabling a first digital personal assistant to perform an operation on behalf of a second digital personal assistant.

The example techniques may simplify a process for accessing content associated with multiple accounts of a digital personal assistant. For instance, a user need not necessarily sign-out with a first account and sign-in with a second account in order to access content associated with the second account. The example techniques may increase user efficiency (e.g., by reducing a number of steps that a user takes to access contextually relevant content and/or to perform an operation with regard to another user). For instance, the example techniques may reduce (e.g., eliminate) a need for a user to manually filter through content of multiple accounts of a digital personal assistant to discover contextually relevant content. The example techniques may reduce (e.g., eliminate) a need for a first user to manually perform an operation with regard to a second user when the operation is capable of being performed by a digital personal assistant of the first user on behalf of a digital personal assistant of the second user and/or when the operation is capable of being delegated by the digital personal assistant of the first user to the digital personal assistant of the second user. The example techniques may reduce an amount of time and/or resources (e.g., processor, memory, network bandwidth) that are consumed to access contextually relevant content and/or to perform an operation with regard to another user. The example embodiments may increase efficiency of a computing device that is used to access content associated with multiple accounts of a digital personal assistant and/or to perform an operation with regard to another user.

FIG. 1 is a block diagram of an example context-aware assistant system 100 in accordance with an embodiment. Generally speaking, context-aware assistant system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, context-aware assistant system 100 implements a context-aware digital personal assistant that supports multiple accounts. Detail regarding techniques for implementing a context-aware digital personal assistant that supports multiple accounts and/or facilitating interaction among digital personal assistants is provided in the following discussion.

As shown in FIG. 1, context-aware assistant system 100 includes a plurality of user devices 102A-102M, a network 104, and a plurality of servers 106A-106N. Communication among user devices 102A-102M and servers 106A-106N is carried out over network 104 using well-known network communication protocols. Network 104 may be a wide-area network (e.g., the Internet), a local area network (LAN), another type of network, or a combination thereof.

User devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User devices 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, user devices 102A-102M are capable of accessing domains (e.g., Web sites) hosted by servers 106A-106N, so that user devices 102A-102M may access information that is available via the domains. Such domain may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, or the like. It will be recognized that any one or more user systems 102A-102M may communicate with any one or more servers 106A-106N.

User devices 102A-102M are shown to include respective digital personal assistants 108A-108M. Digital personal assistants 108A-108M are representations of respective entities that interact with users of user devices 102A-102M. Each of the digital personal assistants 108A-108M may be configured to support multiple accounts. For instance, first digital personal assistant 108A may be configured to provide a first selectively combined content stream that includes content selected from multiple content streams of respective accounts of first user(s) of first user device 102A based at least on a context of at least one of the first user(s). Second digital personal assistant 108B may be configured to provide a second selectively combined content stream that includes content selected from multiple content streams of respective accounts of second user(s) of second user device 102B based at least on a context of at least one of the second user(s), and so on.

Servers 106A-106N are processing systems that are capable of communicating with user devices 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of relevance-based content system 100.

First server(s) 106A is shown to include context-aware assistant logic 110 for illustrative purposes. Context-aware assistant logic 110 is configured to implement digital personal assistants 108A-108M. For example, context-aware assistant logic 110 may implement any one or more of digital personal assistants 108A-108M to support multiple accounts. In another example, context-aware assistant logic 110 may implement any one or more of the digital personal assistants 108A-108M to perform an operation on behalf of another of the digital personal assistants 108A-108M and/or to delegate the operation to another of the digital personal assistants 108A-108M.

Some example functionality of context-aware assistant logic 110 will now be described with reference to first digital personal assistant 108A for purposes of illustration and is not intended to be limiting. It will be recognized that the functionality of context-aware assistant logic 110 described herein is applicable to any suitable digital personal assistant (e.g., any one or more of digital personal assistants 108A-108M).

In a first example, context-aware assistant logic 110 determines that a user is signed-in with multiple accounts of first digital personal assistant 108A. Context-aware assistant logic 110 selectively combines content from content streams that are associated with the respective accounts based on at least a context of the user to generate a selectively combined content stream. Context-aware assistant logic 110 causes first digital personal assistant 108A to provide the selectively combined content stream for presentation to the user. For instance, selectively combining the content may involve determining from which of the accounts and/or from which targets that are connected to those accounts content is to be selected for inclusion in the selectively combined content stream. The content may be selected from any one or more of the accounts and/or from any one or more targets for each account, depending on at least the context of the user. Examples of targets are described in greater detail in the following discussion.

In a second example, context-aware assistant logic 110 determines that multiple users who are signed-in with accounts of first digital personal assistant 108A share a shared user experience provided by first digital personal assistant 108A. For instance, each user is signed-in with one or more accounts of first digital personal assistant 108A. Context-aware assistant logic 110 selectively combines content from content streams that are associated with the respective accounts based on at least a context of one or more of the users to generate a selectively combined content stream. Context-aware assistant logic 110 causes first digital personal assistant 108A to provide the selectively combined content stream for presentation to the users in the shared user experience.

In a third example, first digital personal assistant 108A is associated with a first user (e.g., a user of first user device 102A), and second digital personal assistant 108B is associated with a second user (e.g., a user of second user device 108B). In a first aspect of this example, context-aware assistant logic 110 may determine that first digital personal assistant 108A is authorized to perform an operation on behalf of second digital personal assistant 108B. In accordance with this aspect, context-aware assistant logic 110 may cause first digital personal assistant 108A to perform the operation on behalf of second digital personal assistant 108B. In another aspect of this example, context-aware assistant logic 110 may determine that first digital personal assistant 108A is authorized to delegate an operation to second digital personal assistant 108B. In accordance with this aspect, context-aware assistant logic 110 may cause first digital personal assistant 108A to delegate the operation to second digital personal assistant 108B.

Context-aware assistant logic 110 may be configured to selectively combine content from targets 112 to generate a selectively combined content stream. Examples of a target include but are not limited to an application (e.g., a software application), a service, a bot, and a website. Examples of a service include but are not limited to Bing® which is developed and maintained by Microsoft Corporation, Google® which is developed and maintained by Google Inc., and Yahoo!® which is developed and maintained by Yahoo! Inc. A bot may be referred to as a software robot, a Web crawler, or a Web spider Each account of a digital personal assistant may be connected to one or more of the targets 112. A target may be connected to an account of a digital personal assistant manually by the user or automatically by the digital personal assistant. For instance, the digital personal assistant may use information regarding the user (e.g., preferences and/or historical activities of the user) to determine that a target is to be connected to an account associated with the user. Each of the targets 112 may provide a respective content stream. Context-aware assistant logic 110 may selectively combine content from the content streams that are provided by the targets 112 that are connected to the account(s) of the digital personal assistant to generate the selectively combined content stream.

Targets 112 are shown to be distributed across servers 106A-106N for illustrative purposes and are not intended to be limiting. It will be recognized that targets 112 may be included among any one or more of servers 106A-106N.

It should be noted that as context-aware assistant logic 110 gathers information about a user over time, the relevancy of content that is subsequently selected for inclusion in a selectively combined content stream may be greater than the relevancy of content that was previously selected for inclusion in a selectively combined content stream. For instance, context-aware assistant logic 110 may develop a model of the user or a group to which the user belongs. Context-aware assistant logic 110 may develop and/or refine the model using online learning, for example.

Context-aware assistant logic 110 may be implemented in various ways to implement a context-aware digital personal assistant that supports multiple accounts and/or to facilitate interaction among digital personal assistants, including being implemented in hardware, software, firmware, or any combination thereof. For example, context-aware assistant logic 110 may be implemented as computer program code configured to be executed in one or more processors. In another example, context-aware assistant logic 110 may be implemented as hardware logic/electrical circuitry. For instance, context-aware assistant logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Context-aware assistant logic 110 is shown to be incorporated in first server(s) 106A for illustrative purposes and is not intended to be limiting. It will be recognized that context-aware assistant logic 110 (or any portion(s) thereof) may be incorporated in any one or more of the user systems 102A-102M. For example, client-side aspects of context-aware assistant logic 110 may be incorporated in one or more of the user systems 102A-102M, and server-side aspects of context-aware assistant logic 110 may be incorporated in first server(s) 106A. In another example, context-aware assistant logic 110 may be distributed among the user systems 102A-102M. In yet another example, context-aware assistant logic 110 may be incorporated in a single one of the user systems 102A-102M. In another example, context-aware assistant logic 110 may be distributed among the server(s) 106A-106N. In still another example, context-aware assistant logic 110 may be incorporated in a single one of the server(s) 106A-106N.

In some example embodiments, user(s) may interact with a digital personal assistant via context-aware assistant logic 110 using voice commands, gesture commands, touch commands, and/or hover commands. For example, any one or more of the user devices 102A-102M may have a microphone that is configured to detect voice commands. In another example, any one or more of the user devices 102A-102M may have a camera that is configured to detect gesture commands. In yet another example, any one or more of the user devices 102A-102M may have a touch screen that is configured to detect touch commands and/or hover commands. A hover command may include a hover gesture. A hover gesture can occur without a user physically touching the touch screen. Instead, the user's hand or portion thereof (e.g., one or more fingers) can be positioned at a spaced distance above the touch screen. The touch screen can detect that the user's hand (or portion thereof) is proximate the touch screen, such as through capacitive sensing. Additionally, hand movement and/or finger movement can be detected while the hand and/or finger(s) are hovering to expand the existing options for gesture input.

Example techniques for implementing a context-aware digital personal assistant that supports multiple accounts are discussed in greater detail below with reference to FIGS. 2-10 and 12. Example techniques for facilitating interaction among digital personal assistants are discussed in greater detail below with reference to FIGS. 11A, 11B, and 12.

Figure 11A:
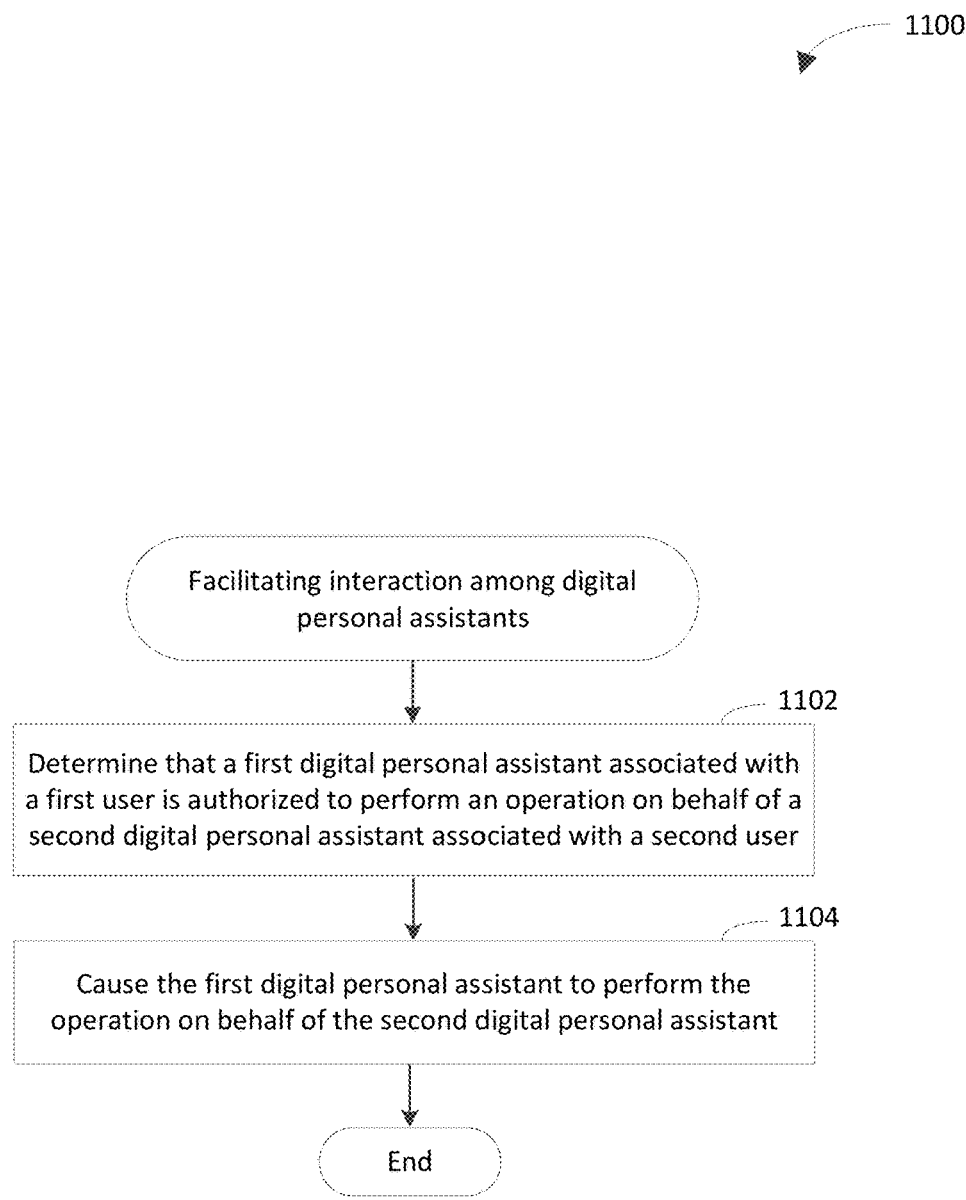
FIGS. 11A and 11B depict flowcharts of example methods for facilitating interaction among digital personal assistants in accordance with embodiments.
Figure 11B:
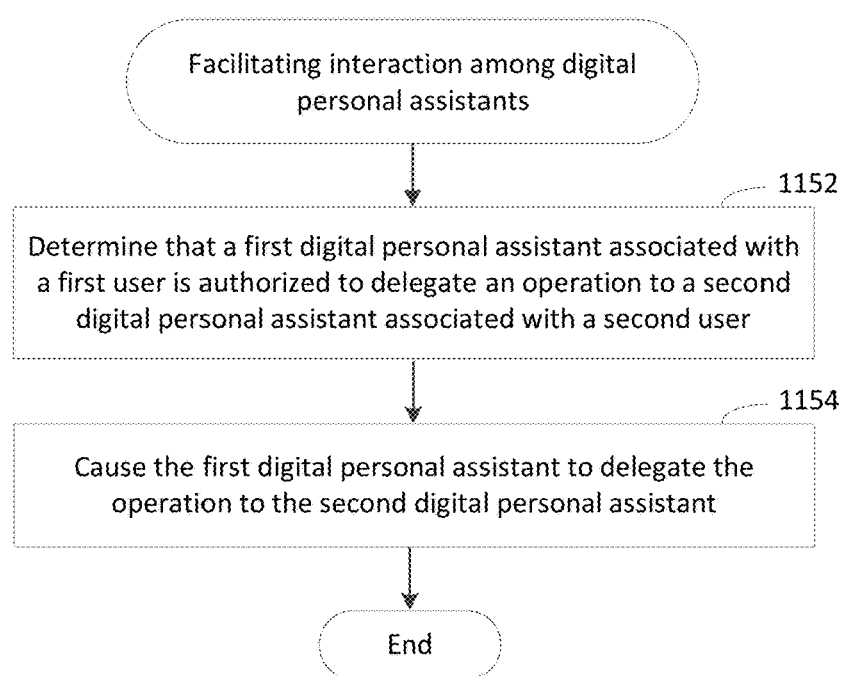
Figure 12:
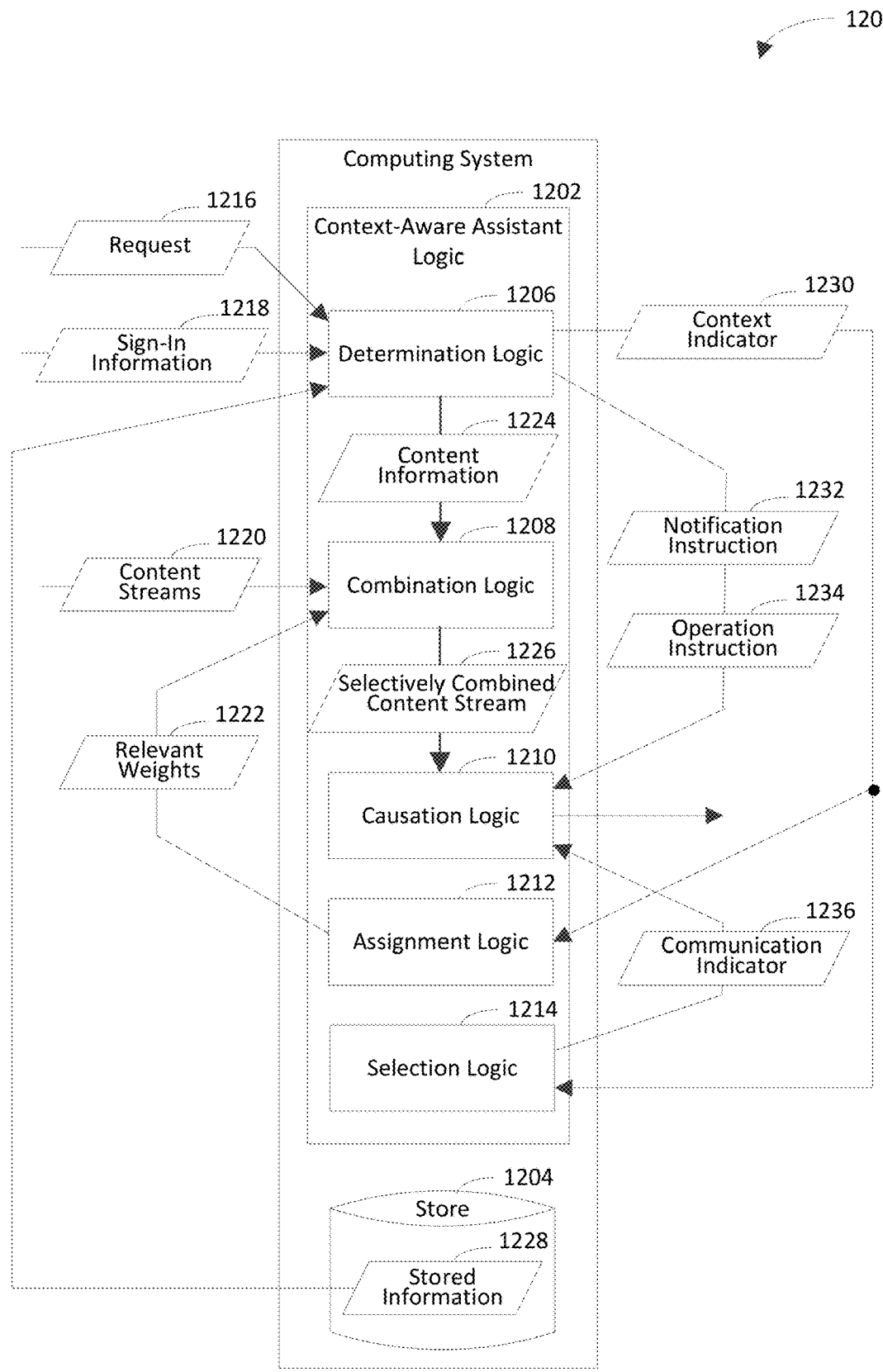
FIG. 12 is a block diagram of an example computing system in accordance with an embodiment.

FIGS. 2-10 depict flowcharts 200, 300, 400, 500, 600, 700, 800, 900, and 1000 of example methods for implementing a context-aware digital personal assistant that supports multiple accounts in accordance with embodiments. FIGS. 11A and 11B depict flowcharts 1100 and 1150 of example methods for facilitating interaction among digital personal assistants in accordance with embodiments. Flowcharts 200, 300, 400, 500, 600, 700, 800, 900, 1000, 1100, and 1150 may be performed by context-aware assistant logic 110 shown in FIG. 1, for example. For illustrative purposes, flowcharts 200, 300, 400, 500, 600, 700, 800, 900, 1000, 1100, and 1150 are described with respect to computing system 1200 shown in FIG. 12. Computing system 1200 may include one or more of user systems 102A-102M, one or more of server(s) 106A-106N, or any combination thereof, though the scope of the example embodiments is not limited in this respect. Computing system 1200 includes context-aware assistant logic 1202, which is an example of context-aware assistant logic 110, and store 1204 according to an embodiment. As shown in FIG. 12, context-aware assistant logic 1202 includes determination logic 1206, combination logic 1208, causation logic 1210, assignment logic 1212, and selection logic 1214. Store 1204 may be any suitable type of store, including but not limited to a database (e.g., a relational database, an entity-relationship database, an object database, an object relational database, an XML database, etc.). Further structural and operational embodiments will be apparent to persons skilled in the relevant art(s) based on the discussion regarding flowcharts 200, 300, 400, 500, 600, 700, 800, 900, 1000, 1100, and 1150.

Figure 2:
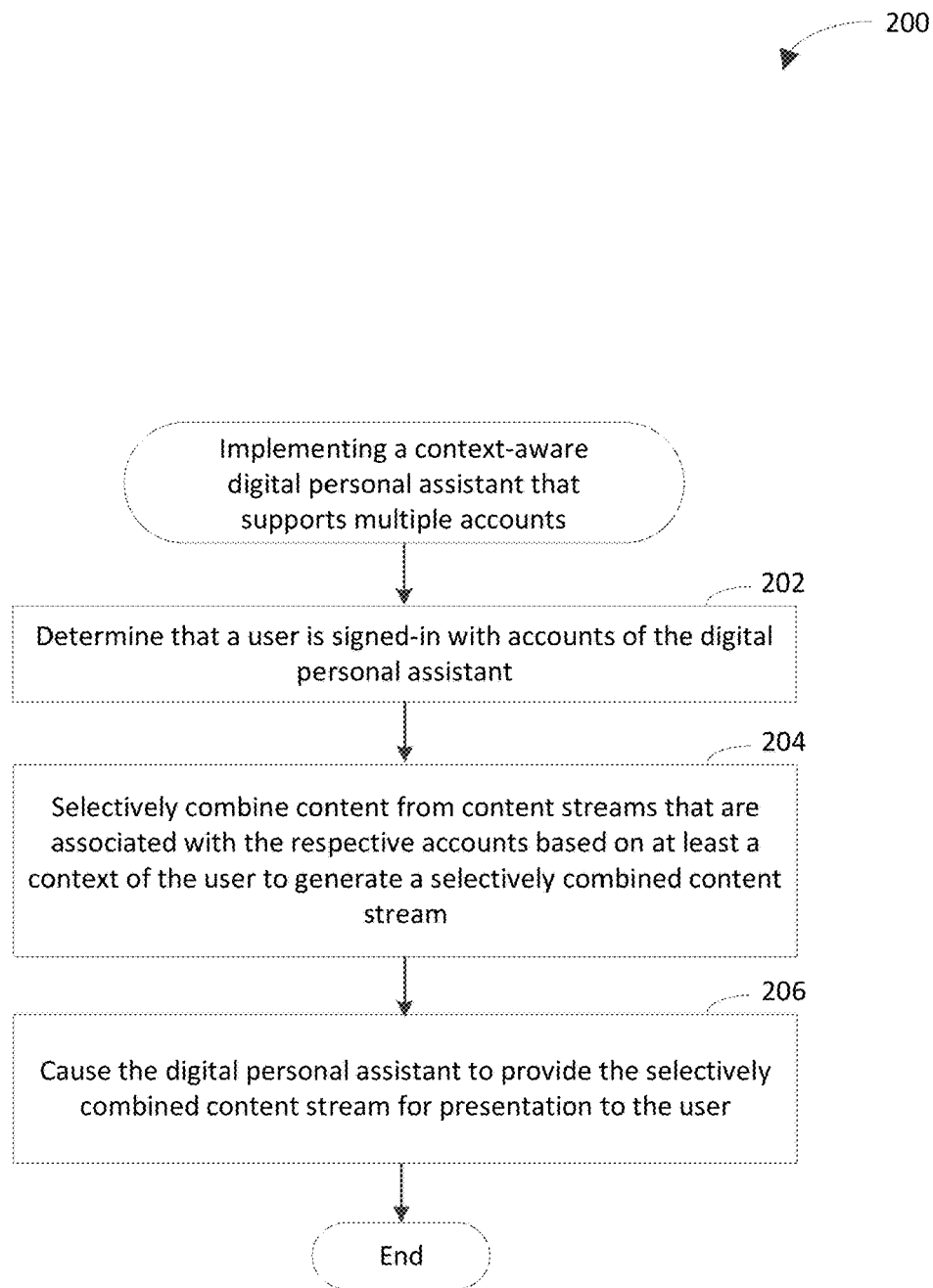
FIGS. 2-10 depict flowcharts of example methods for implementing a context-aware digital personal assistant that supports multiple accounts in accordance with embodiments.

As shown in FIG. 2, the method of flowchart 200 begins at step 202. In step 202, a determination is made that a user is signed-in with accounts of the digital personal assistant. In an example implementation, determination logic 1206 determines that the user is signed-in with designated accounts of the digital personal assistant. For instance, determination logic 1206 may make the determination based on sign-in information 1218 that is received from the user. The sign-in information 1218 may indicate with which accounts of the digital personal assistant the user is signed-in.

At step 204, content from content streams that are associated with the respective accounts is selectively combined based on at least a context of the user to generate a selectively combined content stream. For instance, the content from the content streams may be automatically selectively combined (e.g., without prompting from the user) to generate the selectively combined content stream. The context of the user may be based on any one or more suitable factors. For instance, the context of the user may be derived from (e.g., inferred from) any of such factor(s). Examples of such a factor include but are not limited to a location (e.g., a current or anticipated location of the user, a place with which the user is associated), a time (e.g., a time at which the user performs an operation, encounters a situation, or is at a location), voice signals (e.g., speech or identifying attribute(s) of a voice of the user), an interaction pattern (e.g., of the user with content, device(s), and/or other person(s)), a scheduled event (e.g., a scheduled event of the user and/or a scheduled event of another person that is statistically likely to have an effect on the user), a communication (e.g., a conversation), information regarding a network (e.g., a home network or a work network) that is being used by the user, a device (e.g., a type of the device) on which the digital personal assistant is used, the user being engaged with a device via which the digital personal assistant is provided, an application and/or service that is connected to the device, one or more people in the user's presence, and one or more people with whom the user interacts and/or has a relationship (e.g., one or more family members or co-workers of the user).

The aforementioned communication may be any suitable communication, including but not limited to a communication to the user, a communication from the user, a communication related to a scheduled event of the user, a communication related to a group (e.g., team) that includes the user, a communication regarding one or more opportunities (e.g., career opportunities, dating opportunities) that are available to the user, and a communication related to an organization with which the user is associated. The communication may be a message (e.g., a textual message or a verbal message) or a combination of messages. Examples of a message include but are not limited to an email, a text message, a short message service (SMS) message, and a social update. A determination whether a user is engaged with a device may be made based at least in part on the user turning on the device, or providing a command (e.g., pressing a key, providing a touch, hover, or gesture command, signing-in to the device or an account using the device, moving a cursor of the device) via an interface of the device.

Some other examples of such a factor include but are not limited to the user working late, the user working during lunch, the user being proximate an entity (e.g., a business) while in transit to a destination (e.g., home or work), search history of the user, browse history of the user, applications that have been opened by the user or that are currently opened by the user, and habit(s) of the user.

In an example implementation, combination logic 1208 selectively combines the content from content streams 1220 that are associated with the respective accounts based on at least the context of the user to generate a selectively combined content stream 1226. For instance, determination logic 1206 may determine attributes of the content from the content streams 1220. Determination logic 1206 may generate content information 1224 to specify the attributes. Combination logic 1208 may compare the attributes that are specified by the content information 1224 to the context of the user to determine which content from the content streams 1220 corresponds to the context of the user. For example, combination logic 1208 may determine a statistical probability that the content from the content streams 1220 corresponds to the context of the user. In accordance with this example, content having a statistical probability greater than or equal to a threshold probability may indicate that the content corresponds to the context of the user. Content having a statistical probability less than the threshold probability may indicate that the content does not correspond to the context of the user. Combination logic 1208 may combine the content that is deemed to correspond to the context of the user (e.g., and not the content that is deemed to not correspond to the context of the user) to generate the selectively combined content stream 1226. Accordingly, combination logic 1208 may include the content that is deemed to correspond to the context of the user and not the content that is deemed to not correspond to the context of the user in the selectively combined content stream 1226.

At step 206, the digital personal assistant is caused to provide the selectively combined content stream for presentation to the user. In an example implementation, causation logic 1210 causes the digital personal assistant to provide the selectively combined content stream 1226 for presentation to the user. For instance, causation logic 1210 may cause the digital personal assistant to provide the selectively combined content stream 1226 for presentation on a computing device of the user (e.g., any one or more of user devices 102A-102M).

In an example embodiment, determining that the user is signed-in with the accounts at step 202 includes determining that the user is signed-in with work accounts that are associated with respective attributes associated with work of the user. The work accounts include at least a first work account and a second work account. Examples of an attribute that may be associated with the work of the user include but are not limited to a location at which the user works and a business for which the user works (e.g., a business owned by the user). For example, the first work account may be associated with a first location, and the second work account may be associated with a second location that is different from the first location. In another example, the first work account may be associated with a first business, and the second work account may be associated with a second business that is different from the first business. In accordance with this embodiment, selectively combining the content at step 204 includes selectively combining first content from a first work-related content stream associated with the first work account and second content from a second work-related content stream associated with the second work account based on at least the context of the user to generate the selectively combined content stream. A work-related content stream is a content stream that includes at least some content that relates to work of the user.

In another example embodiment, determining that the user is signed-in with the accounts at step 202 includes determining that the user is signed-in with personal accounts that are associated with respective attributes associated with a personal life of the user (e.g., life of the user outside a work environment). The personal accounts include at least a first personal account and a second personal account. Examples of an attribute that may be associated with the life of the user include but are not limited to a location at which the user lives and/or vacations, one or more members of a family of the user, and a social group to which the user belongs. In accordance with this embodiment, selectively combining the content at step 204 includes selectively combining first content from a first content stream associated with the first personal account and second content from a second content stream associated with the second personal account based on at least the context of the user to generate the selectively combined content stream.

In yet another example embodiment, the content streams include at least a first content stream, a second content stream, and a third content stream associated with a first account, a second account, and a third account, respectively. In accordance with this embodiment, selectively combining the content at step 204 includes selectively combining the content (a) from at least the first and second content streams and not from the third content stream or (b) from at least the first and third content streams and not from the second content stream depending on whether the context of the user is a first context or a second context. The first context corresponds to the content being selected from at least the first and second content streams and not from the third content stream. The second context corresponds to the content being selected from at least the first and third content streams and not from the second content stream. The second and third accounts may be respective work accounts of the user or respective personal accounts of the user, though the example embodiments are not limited in this respect.

In still another example embodiment, the content is selectively combined at step 204 based at least in part on whether a privacy policy indicates that the content is not to be included in the selectively combined content stream. For example, the privacy policy may indicate that designated content is not to be included in the selectively combined content stream (e.g., in response to the context of the user being a specified context, such as a work context or a personal context). In an aspect of this example, the privacy policy may specify that the particular designated content is not to be included in the selectively combined content stream. In accordance with this example, selectively combining the content at step 204 may include not including the particular designated content in the selectively combined content stream in response to the privacy policy specifying that the particular designated content is not to be included in the selectively combined content stream.

In another aspect of this example, the privacy policy may specify one or more types of content that are not to be included in the selectively combined content stream. In accordance with this aspect, at least one of the one or more types of content may include the designated content. In further accordance with this aspect, selectively combining the content at step 204 may include not including the designated content in the selectively combined content stream in response to the designated content being included in the at least one of the one or more types of content that are specified by the privacy policy.

In yet another aspect of this example, the privacy policy may specify one or more accounts associated with one or more respective content streams from which content is not to be included in the selectively combined content stream. In accordance with this aspect, at least one of the one or more accounts may be associated with a content stream that includes the designated content. In further accordance with this aspect, selectively combining the content at step 204 may include not including the designated content in the selectively combined content stream in response to the designated content being included in the content stream with which at least one of the one or more accounts is associated.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes determining that the context of the user is to change from a first context to a second context based on satisfaction of one or more criteria. For example, the determination may be made based on at least the user changing from a first location (e.g., that is associated with the first context) to a second location that is associated with the second context. For instance, the determination may be made based on at least the user coming within a designated proximity to the second location. In another example, the determination may be made based on at least a conversation that occurs between the user and one or more other people that indicates the context of the user is to change from the first context to the second context. In yet another example, the determination may be made based on at least a statement made by the user indicating that the context of the user is to change from the first context to the second context. In still another example, the determination may be made based on at least a scheduled event associated with the second context being within a threshold duration of time from a current time. For instance, the scheduled event may be identified by a calendar entry of the user.

In an example implementation, determination logic 1206 may determine that the context of the user is to change from the first context to the second context based on satisfaction of the one or more criteria. Determination logic 1206 may generate a notification instruction 1232 in response to (e.g., based at least in part on) determining that the context of the user is to change from the first context to the second context. For example, the notification instruction 1232 may specify that a notification is to be sent to the user. In another example, the notification instruction 1232 may indicate that the context of the user is to change from the first context to the second context. The notification instruction 1232 may instruct causation logic 1210 to cause the digital personal assistant to provide the notification to the user.

The notification may include an inquiry. For example, determination logic 1206 may determine that the user is leaving work. In accordance with this example, the digital personal assistant may inform the user that a friend of the user needs a ride home and inquire whether the user would like to give the friend a ride home.

The notification may include a recommendation that recommends that the user perform an action (e.g., an action related to the first context and/or the second context. For instance, the notification may recommend that the user perform an action in anticipation of the context of the user changing from the first context to the second context. In one example, the first context may be a work context, and the second context may be a personal context. In accordance with this example, the notification may recommend that the user leave a contact card (e.g., a business card) before leaving the work context. In another example, the digital personal assistant may be aware that the user will be attending a Facebook® event later in the day where barbecue will be served. In accordance with this example, the digital personal assistant may ask the user whether the user has bought drinks and/or side dishes for the event in anticipation of the event.

The notification may inform the user of an event that is to occur in the second context. Examples of an event include but are not limited to a meeting that the user is to attend, a deadline that is to occur, and a dinner in which the user is to participate (e.g., dinner with the user's spouse). In one example, the user may have a full-time job and teach a class at a local community college. In accordance with this example, the digital personal assistant may notify the user while the user is at the full-time job (e.g., in the first context) that the user should start heading toward the community college to teach the class (e.g., in the second context) as the start time of the class approaches. For instance, the digital personal assistant may consider travel time to determine when to notify the user to start heading toward the community college.

In accordance with this embodiment, the method of flowchart 200 further includes causing the digital personal assistant to provide a notification to the user regarding the first context or the second context. For instance, the digital personal assistant may be caused to provide the notification in response to determining that the context of the user is to change from the first context to the second context. The digital personal assistant may be caused to provide the notification in any of a variety of ways. For example, the digital personal assistant may be caused to provide the notification proactively on behalf of the user. In another example, the digital personal assistant may be caused to provide the notification reactively based on an instruction that is received form the user. In an example implementation, causation logic 1210 causes the digital personal assistant to provide the notification to the user. For example, causation logic 1210 may cause the digital personal assistant to provide the notification to the user in response to receipt of the notification instruction 1232. In accordance with this example, causation logic 1210 may cause the digital personal assistant to provide the notification to the user based at least on the notification instruction 1232 specifying that the notification is to be sent to the user.

In another example embodiment, the method of flowchart 200 further includes determining that a first content stream associated with a first account is not accessible while the user is in the first context. For instance, the first content stream may not be accessible while the user is at a specified location (e.g., within a designated proximity of the specified location), while the user is projecting a screen of the user's computing device, and/or during a specified time period (e.g., in the morning, in the evening, during lunchtime, or during work hours). Examples of a specified location include but are not limited to a workplace of the user, a place outside of the workplace of the user, and a specified room in a building. In an example implementation, determination logic 1206 determines that the first content stream is not accessible while the user is in the first context. In accordance with this implementation, determination logic 1206 may generate a notification instruction 1232 to indicate that a notification is to be provided to the user to indicate that the first content stream is not accessible while the user is in the first context.

In accordance with this embodiment, the method of flowchart 200 further includes causing the digital personal assistant to notify the user that the first content stream is not accessible while the user is in the first context (e.g., in response to determining that the first content stream is not accessible while the user is in the first context). In an example implementation, causation logic 1210 causes the digital personal assistant to notify the user that the first content stream is not accessible while the user is in the first context. For example, causation logic 1210 may cause the digital personal assistant to provide a notification to the user that indicates that the first content stream is not accessible while the user is in the first context in response to receipt of the notification instruction 1232.

In an aspect of this embodiment, the method of flowchart 200 further includes determining that the first content stream is accessible while the user is in a context other than the first context. For instance, determination logic 1206 may determine that the first content stream is accessible while the user is in a context other than the first context. In accordance with this aspect, causing the digital personal assistant to notify the user that the first content stream is not accessible while the user is in the first context includes causing the digital personal assistant to notify the user that the first content stream is accessible in a context other than the first context (e.g., in a second context that is different from the first context). For instance, the digital personal assistant may be caused to recommend that the user enter the other context to obtain access to the first content stream.

In yet another example embodiment, the method of flowchart 200 further includes causing the digital personal assistant to provide an inquiry for the user. The inquiry indicates at least one data source that is associated with a first account. The inquiry requests authorization (e.g., for the digital personal assistant) to include first content from the at least one data source in the content stream that is associated with the first account. In accordance with this embodiment, the method of flowchart 200 further includes receiving a response to the inquiry. The response indicates that the authorization is granted (e.g., for the digital personal assistant) to include the first content from the at least one data source in the content stream that is associated with the first account. In further accordance with this embodiment, selectively combining the content at step 204 includes selectively including the first content in the selectively combined content stream based on at least the response indicating that the authorization is granted to include the first content from the at least one data source in the content stream that is associated with the first account.

In still another example embodiment, a privacy policy indicates that a third-party is authorized to view a portion of the selectively combined content stream. Examples of a third-party include but are not limited to an employer of the user, a co-worker of the user, a classmate of the user, a friend of the user, and a member of a family of the user. In accordance with this embodiment, the privacy policy indicates that the third-party is not authorized to view designated content that is included in the selectively combined content stream. For instance, determination logic 1206 may check (e.g., review) the privacy policy to determine that the third-party is authorized to view the portion and that the third-party is not authorized to view the designated content. In further accordance with this embodiment, the method of flowchart 200 further includes causing the portion of the selectively combined content stream and not the designated content to be viewable by the third-party based at least in part on the privacy policy indicating that the third party is authorized to view the portion and that the third-party is not authorized to view the designated content. For instance, causation logic 1210 may cause the portion of the selectively combined content stream 1226 and not the designated content that is included in the selectively combined content stream 1226 to be viewable by the third-party based at least in part on the privacy policy indicating that the third party is authorized to view the portion and that the third-party is not authorized to view the designated content.

In an aspect of this embodiment, the privacy policy may indicate that the third-party is not authorized to view the particular designated content. In accordance with this example, causing the portion of the selectively combined content stream and not the designated content to be viewable by the third-party may be performed based at least in part on the privacy policy indicating that the third-party is not authorized to view the particular designated content.

In another aspect of this embodiment, the privacy policy may indicate that the third-party is not authorized to view one or more types of content. In accordance with this aspect, at least one of the one or more types of content may include the designated content. In further accordance with this aspect, causing the portion of the selectively combined content stream and not the designated content to be viewable by the third-party may be performed based at least in part on the designated content being included in at least one of the one or more types of content that the third party is not authorized to view.

In yet another aspect of this embodiment, the privacy policy may indicate that the third-party is not authorized to view content from one or more content streams associated with one or more respective accounts. In accordance with this aspect, at least one account of the one or more accounts may be associated with at least one respective content stream that includes the designated content. In further accordance with this aspect, causing the portion of the selectively combined content stream and not the designated content to be viewable by the third-party may be performed based at least in part on the designated content being included in the at least one content stream that is associated with the at least one respective account.

Figure 3:
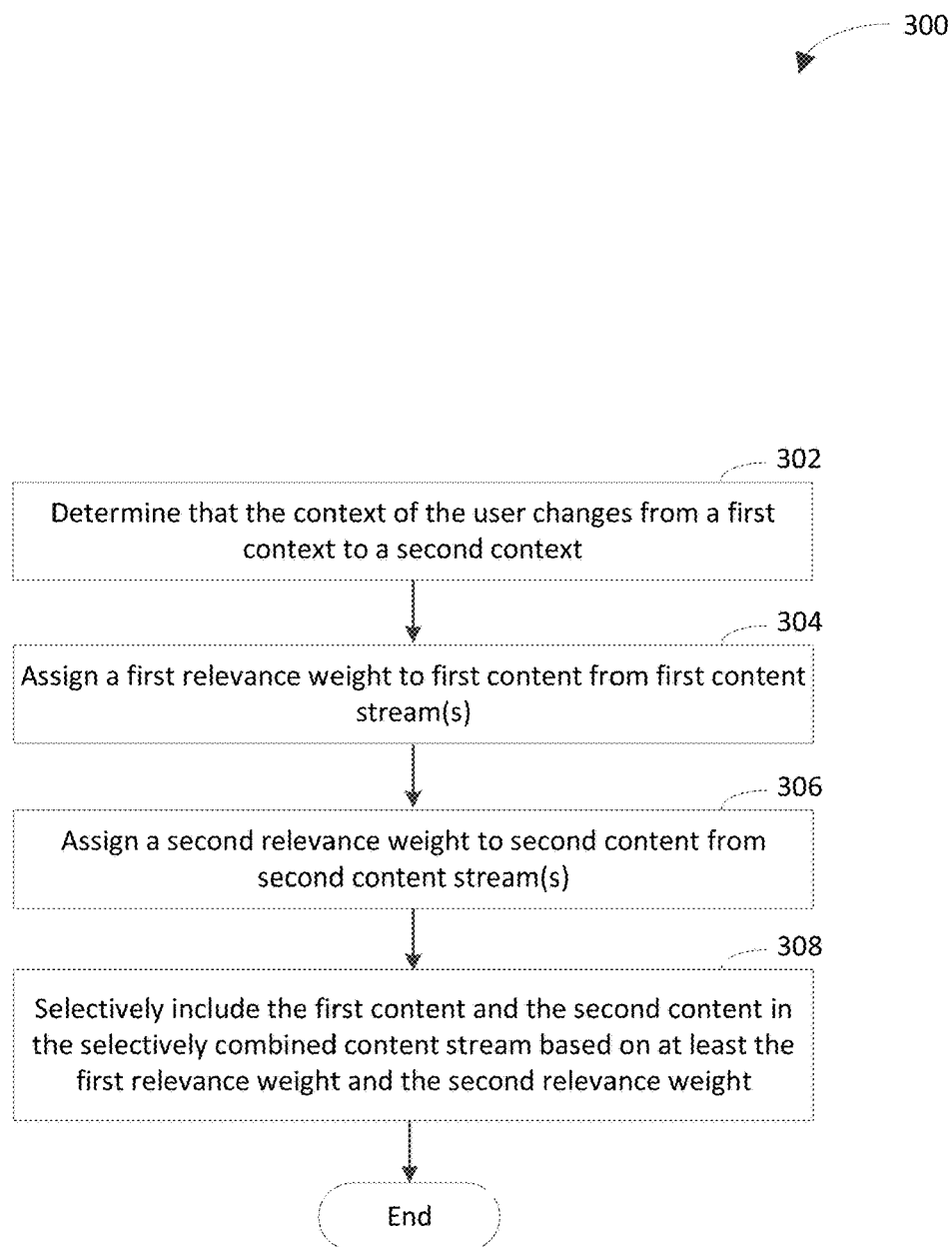

In another example embodiment, the method of flowchart 200 includes one or more of the steps shown in flowchart 300 of FIG. 3.

As shown in FIG. 3, the method of flowchart 300 begins at step 302. In step 302, a determination is made that the context of the user changes from a first context to a second context. In an example implementation, determination logic 1206 determines that the context of the user changes from the first context to the second context. In accordance with this implementation, determination logic 1206 may generate a context indicator 1230 in response to making the determination. The context indicator 1230 may specify that the context of the user is to change from the first context to the second context.

At step 304, a first relevance weight is assigned to first content from first content stream(s). For instance, the first relevance weight may be assigned to the first content in response to determining that the context of the user changes from the first context to the second context at step 302. A relevance weight that is assigned to content indicates an extent to which the content is relevant to a user. A relatively lesser relevance weight indicates that the content is relatively less relevant to the user. A relatively greater relevance weight indicates that the content is relatively more relevant to the user. In an example implementation, assignment logic 1212 assigns the first relevance weight to the first content. For instance, assignment logic 1212 may assign the first relevance weight to the first content in response to receipt of the context indicator (e.g., in response to the context indicator 1230 specifying that the context of the user changes from the first context to the second context).

At step 306, a second relevance weight is assigned to second content from second content stream(s). For instance, the second relevance weight may be assigned to the second content in response to determining that the context of the user changes from the first context to the second context at step 302. The second relevance weight may be greater than the first relevance weight. In an example implementation, assignment logic 1212 assigns the second relevance weight to the second content. For instance, assignment logic 1212 may assign the second relevance weight to the second content in response to receipt of the context indicator (e.g., in response to the context indicator 1230 specifying that the context of the user changes from the first context to the second context).

At step 308, the first content and the second content are selectively included in the selectively combined content stream based on at least the first relevance weight and the second relevance weight. For instance, the second content may be more likely than the first content to be included in the selectively combined content stream if the second relevance weight is greater than the first relevance weight. Step 308 may be included in step 204 of flowchart 200. In an example implementation, combination logic 1208 may selectively include the first content and the second content in the selectively combined content stream 1226 based on at least the first relevance weight and the second relevance weight. For instance, combination logic 1208 may selectively include the first content and the second content in the selectively combined content stream 1226 in response to receipt of relevance weights 1222, which may include the first relevance weight and the second relevance weight.

Figure 4:
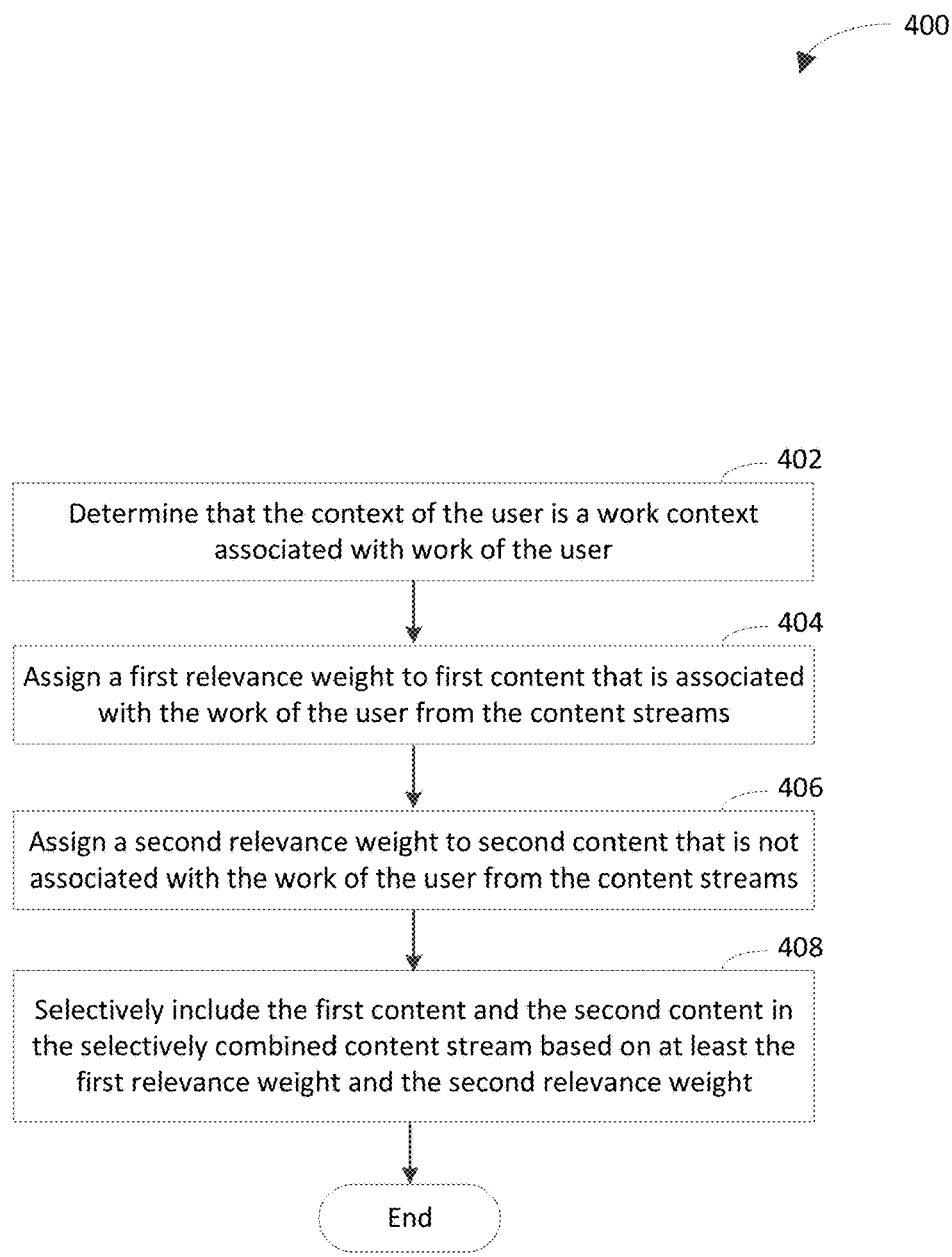

In another example embodiment, the method of flowchart 200 includes one or more of the steps shown in flowchart 400 of FIG. 4.

As shown in FIG. 4, the method of flowchart 400 begins at step 402. In step 402, a determination is made that the context of the user is a work context associated with work of the user. For instance, the determination that the context of the user is the work context may be based on at least a determination that the user is at a work location and/or that the user performs a work-related task. In an example implementation, determination logic 1206 may determine that the context of the user is the work context. In accordance with this implementation, determination logic 1206 may generate a context indicator 1230 in response to making the determination. The context indicator 1230 may specify that the context of the user is the work context.

At step 404, a first relevance weight is assigned to first content that is associated with the work of the user from the content streams. In an example implementation, assignment logic 1212 assigns the first relevance weight to the first content. For instance, assignment logic 1212 may assign the first relevance weight to the first content in response to receipt of the context indicator (e.g., in response to the context indicator 1230 specifying that the context of the user is the work context).

At step 406, a second relevance weight is assigned to second content that is not associated with the work of the user from the content streams. The first relevance weight may be greater than the second relevance weight. In an example implementation, assignment logic 1212 assigns the second relevance weight to the second content. For instance, assignment logic 1212 may assign the second relevance weight to the second content in response to receipt of the context indicator (e.g., in response to the context indicator 1230 specifying that the context of the user is the work context).

At step 408, the first content and the second content are selectively included in the selectively combined content stream based on at least the first relevance weight and the second relevance weight. Step 408 may be included in step 204 of flowchart 200. In an example implementation, combination logic 1208 may selectively include the first content and the second content in the selectively combined content stream 1226 based on at least the first relevance weight and the second relevance weight, which may be included in the relevance weights 1222.

Figure 5:
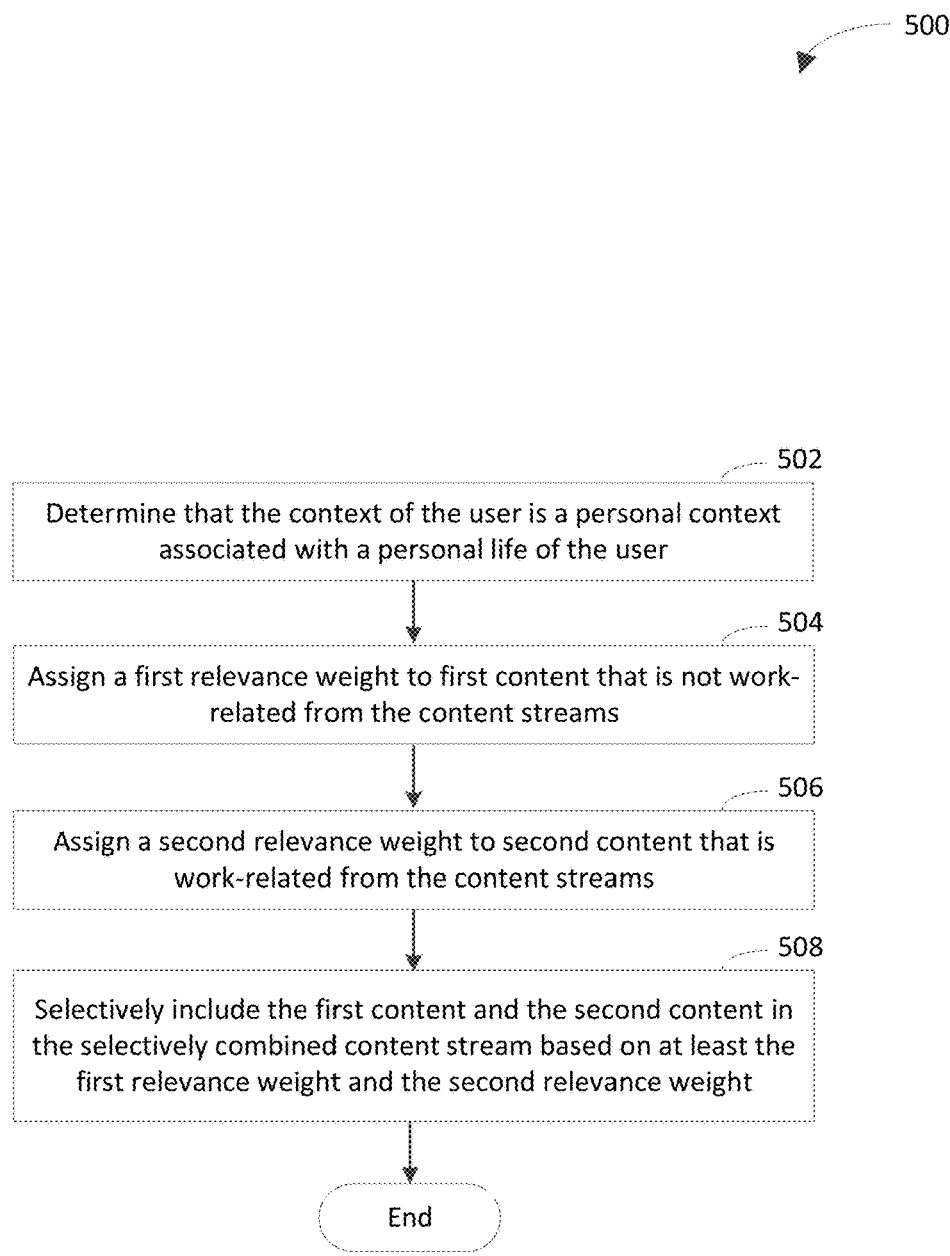

In yet another example embodiment, the method of flowchart 200 includes one or more of the steps shown in flowchart 500 of FIG. 5.

As shown in FIG. 5, the method of flowchart 500 begins at step 502. In step 502, a determination is made that the context of the user is a personal context associated with a personal life of the user. A personal life of a user is a part of the life of the user that is outside of a work environment. For instance, the determination that the context of the user is the personal context may be based on at least a determination that the user is at home, that the user performs a task with regard to a friend and/or a family member, and/or that the user performs a recreational task. In an example implementation, determination logic 1206 may determine that the context of the user is the personal context. In accordance with this implementation, determination logic 1206 may generate a context indicator 1230 in response to making the determination. The context indicator 1230 may specify that the context of the user is the personal context.

At step 504, a first relevance weight is assigned to first content that is not work-related from the content streams. Work-related content is content that is associated with work of the user. In an example implementation, assignment logic 1212 assigns the first relevance weight to the first content, which is not work-related. For instance, assignment logic 1212 may assign the first relevance weight to the first content in response to receipt of the context indicator (e.g., in response to the context indicator 1230 specifying that the context of the user is the personal context).

At step 506, a second relevance weight is assigned to second content that is work-related from the content streams. The first relevance weight may be greater than the second relevance weight. In an example implementation, assignment logic 1212 assigns the second relevance weight to the second content, which is work-related. For instance, assignment logic 1212 may assign the second relevance weight to the second content in response to receipt of the context indicator (e.g., in response to the context indicator 1230 specifying that the context of the user is the personal context).

At step 508, the first content and the second content are selectively included in the selectively combined content stream based on at least the first relevance weight and the second relevance weight. Step 508 may be included in step 204 of flowchart 200. In an example implementation, combination logic 1208 may selectively include the first content and the second content in the selectively combined content stream 1226 based on at least the first relevance weight and the second relevance weight, which may be included in the relevance weights 1222.

Figure 6:
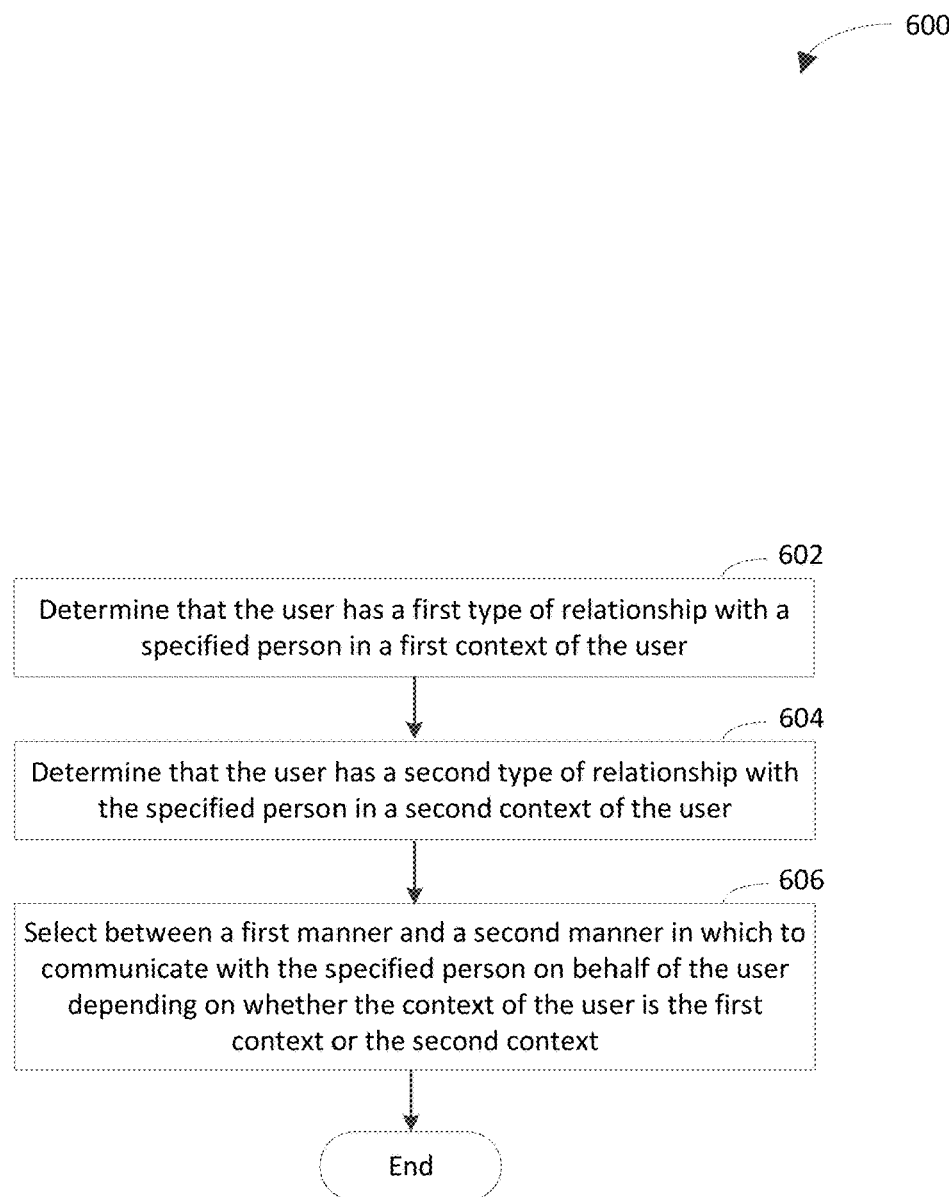

In still another example embodiment, the method of flowchart 200 includes one or more of the steps shown in flowchart 600 of FIG. 6.

As shown in FIG. 6, the method of flowchart 600 begins at step 602. In step 602, a determination is made that the user has a first type of relationship with a specified person in a first context of the user. Example types of a relationship include but are not limited to friend, co-worker, family member. In an example implementation, determination logic 1206 determines that the user has the first type of relationship with the specified person in the first context of the user.

At step 604, a determination is made that the user has a second type of relationship with a specified person in a second context of the user. The first type is different from the second type. For example, the first type may be friend, and the second type may be co-worker. In another example, the first type may be family member, and the second type may be co-worker. In yet another example, the first type may be friend, and the second type may be family member. In an example implementation, determination logic 1206 determines that the user has the second type of relationship with the specified person in the second context of the user.

At step 606, a selection is made between a first manner and a second manner in which to communicate with the specified person on behalf of the user depending on whether the context of the user is the first context or the second context. The first manner corresponds to the context of the user being the first context. The second manner corresponds to the context of the user being the second context. Example manners in which to communicate include but are not limited to email (e.g., personal email, corporate email, Yahoo!® mail, Gmail®, and Outlook.com™ mail), instant message (e.g., WhatsApp® message, Yahoo! ® Messenger message, Facebook® Messenger message, Microsoft® Messenger message, Windows Live® Messenger message, Google Talk® message), and SMS message. In an example implementation, selection logic 1214 selects between the first manner and the second manner. For instance, selection logic 1214 may select between the first manner and the second manner depending on whether the context indicator 1230 indicates that the context of the user is the first context or the second context. For instance, selection logic 1214 may be configured to select the first manner in response to the context indicator 1230 indicating that the context the user is the first context. Selection logic 1214 may be configured to select the second manner in response to the context indicator 1230 indicating that the context the user is the second context.

In an aspect of this embodiment, first preference(s) of the user are associated with the first context. The first preference(s) indicate that the first manner of communication is to be used in the first context. In accordance with this aspect, second preference(s) of the user are associated with the second context. The second preference(s) indicate that the second manner of communication is to be used in the second context.

Figure 7:
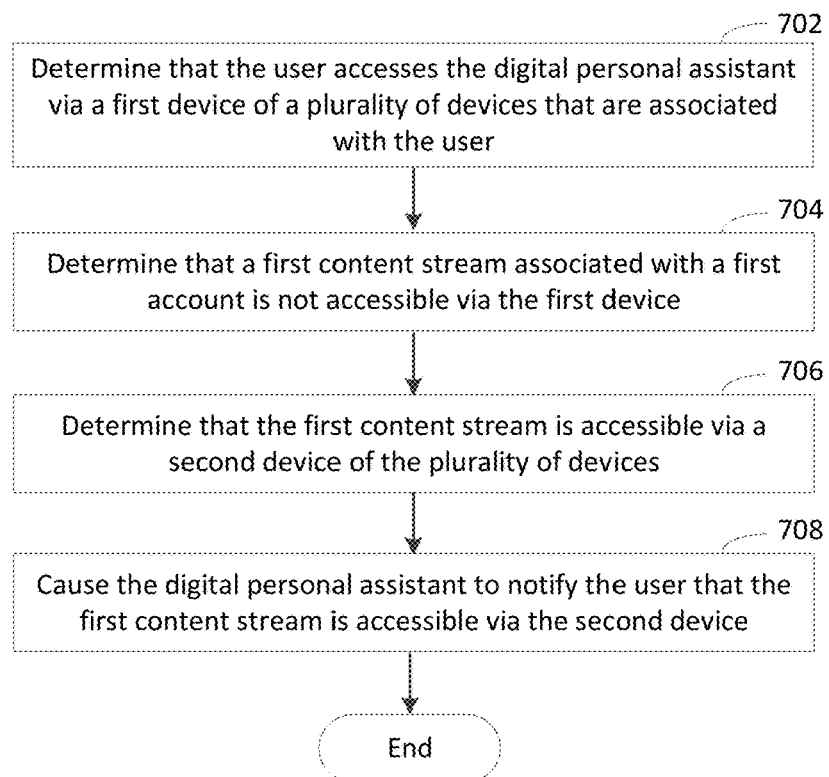

In another example embodiment, the method of flowchart 200 includes one or more of the steps shown in flowchart 700 of FIG. 7.

As shown in FIG. 7, the method of flowchart 700 begins at step 702. In step 702, a determination is made that the user accesses (e.g., is accessing) the digital personal assistant via a first device of a plurality of devices that are associated with the user. In an example implementation, determination logic 1206 determines that the user accesses the digital personal assistant via the first device.

At step 704, a determination is made that a first content stream associated with a first account is not accessible via the first device. For instance, the user may not have authorization to access the first content via the first device (e.g., based on at least an information technology (IT) policy). In an example implementation, determination logic 1206 determines that the first content stream is not accessible via the first device.

At step 706, a determination is made that the first content stream is accessible via a second device of the plurality of devices. For instance, the user may have authorization (e.g., may be authorized) to access the first content via the second device. In an example implementation, determination logic 1206 determines that the first content stream is accessible via the second device. Determination logic 1206 may generate a notification instruction 1232 in response to determining that the first content stream is accessible via the second device. The notification instruction 1232 may indicate that the first content stream is not accessible via the first device and/or that the first content stream is accessible via the second device. For instance, the notification instruction 1232 may instruct causation logic 1210 to cause the digital personal assistant to notify the user that the first content stream is not accessible via the first device and/or that the first content stream is accessible via the second device.

At step 708, the digital personal assistant is caused to notify the user that the first content stream is accessible via the second device. The digital personal assistant may be caused to notify the user that the first content stream is not accessible via the first device. The digital personal assistant may be caused to notify the user in response to determining that the first content stream is not accessible via the first device at step 704 and/or in response to determining that the first content stream is accessible via the second device at step 706. For example, the digital personal assistant may inform the user that the digital personal assistant cannot show content from the first content stream to the user on the first device, but the digital personal assistant can show the content from the first content stream to the user on the second device. In accordance with this example, the digital personal assistant may suggest that the user switch to the second device so that the content from the first content stream may be shown to the user.

In an example implementation, causation logic 1210 causes the digital personal assistant to notify the user. For instance, causation logic 1210 may notify the user in response to receipt of the notification instruction 1232 (e.g., in response to the notification instruction 1232 indicating that the first content stream is not accessible via the first device and/or that the first content stream is accessible via the second device).

In an aspect of this embodiment, determining that the first content stream is not accessible via the first device at step 704 may be based on at least the context of the user. Accordingly, the determination may be due at least in part to the context of the user. For instance, the first content stream may not be accessible via the first device while the user is at a specified location, while the user is projecting a screen of the user's computing device, and/or during a specified time period.

Figure 8:
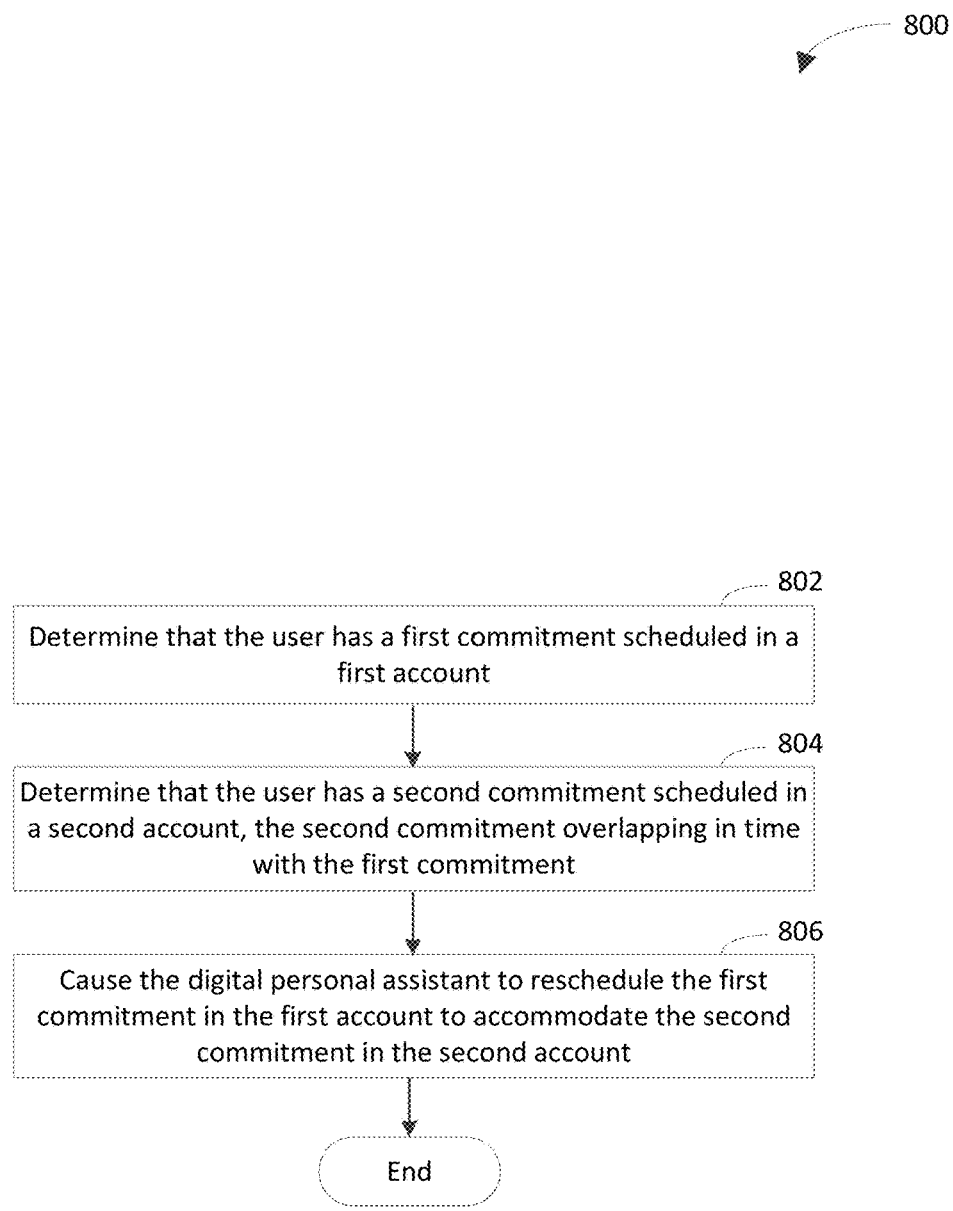

In yet another example embodiment, the method of flowchart 200 includes one or more of the steps shown in flowchart 800 of FIG. 8.

As shown in FIG. 8, the method of flowchart 800 begins at step 802. In step 802, a determination is made that the user has a first commitment scheduled in a first account. In an example implementation, determination logic 1206 determines that the user has the first commitment scheduled in the first account.

At step 804, a determination is made that the user has a second commitment scheduled in a second account. The second commitment overlaps in time with the first commitment. In an example implementation, determination logic 1206 determines that the user has the second commitment scheduled in the second account. Determination logic 1206 may further determine that the second commitment overlaps in time with the first commitment. Determination logic 1206 may generate an operation instruction 1234 in response to determining that the second commitment overlaps in time with the first commitment. The operation instruction 1234 may indicate that the first commitment and/or the second commitment are to be rescheduled. For instance, the operation instruction 1234 may instruct causation logic 1210 to cause the digital personal assistant to reschedule the first commitment and/or the second commitment.

At step 806, the digital personal assistant is caused to reschedule (e.g., automatically reschedule) the first commitment in the first account to accommodate the second commitment in the second account. In an example implementation, causation logic 1210 causes the digital personal assistant to reschedule the first commitment to accommodate the second commitment (e.g., so that the second commitment does not overlap in time with the first commitment). For instance, causation logic 1210 may cause the digital personal assistant to reschedule the first commitment in response to receipt of the operation instruction 1234 (e.g., in response to the operation instruction 1234 indicating that the first commitment and/or the second commitment are to be rescheduled).

In an aspect of this embodiment, the method of flowchart 200 further includes determining that the user is more likely to reschedule the first commitment than to reschedule the second commitment based on historical information and/or a preference associated with the user. For instance, determination logic 1206 may determine that the user is more likely to reschedule the first commitment than to reschedule the second commitment based on the historical information and/or the preference. In accordance with this aspect, causing the digital personal assistant to reschedule the first commitment at step 806 is performed in response to determining that the user is more likely to reschedule the first commitment than to reschedule the second commitment.

In a first implementation of this aspect, the method of flowchart 200 may further include notifying the user that the first commitment has been rescheduled in response to rescheduling the first commitment. In accordance with this implementation, notifying the user may include presenting an inquiry for the user. The inquiry may ask whether an updated schedule is to be shown to the user. The updated schedule shows an updated time at which the first commitment is scheduled.

In a second implementation of this aspect, the method of flowchart 200 may further include causing the digital personal assistant to provide an inquiry for the user. The inquiry requests authorization (e.g., for the digital personal assistant) to reschedule the first commitment. For instance, causation logic 2110 may cause the digital personal assistant to provide the inquiry for the user. In accordance with this implementation, the method of flowchart 200 further includes receiving a response to the inquiry. For example, the response may be received from the user. The response indicates that the authorization is granted (e.g., for the digital personal assistant) to reschedule the first commitment. For instance, causation logic 1210 may receive the response to the inquiry. In further accordance with this implementation, causing the digital personal assistant to reschedule the first commitment at step 806 is performed further in response to receiving the response to the inquiry.

Figure 9:
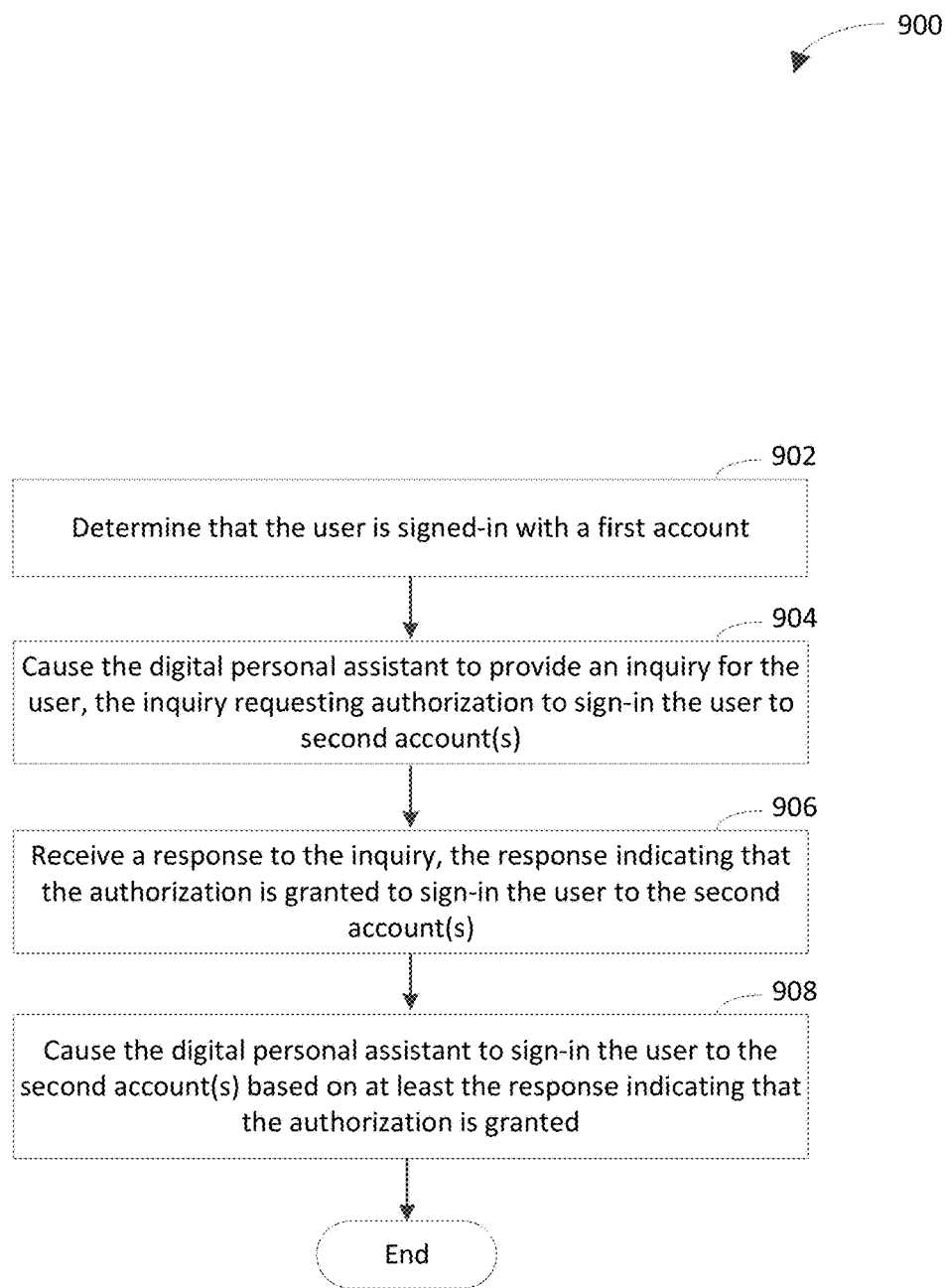

In an example embodiment, step 202 of flowchart 200 may include one or more of the steps shown in flowchart 900 of FIG. 9.

As shown in FIG. 9, the method of flowchart 900 begins at step 902. In step 902, a determination is made that the user is signed-in with a first account. In an example implementation, determination logic 1206 determines that the user is signed-in with the first account. Determination logic 1206 may generate operation instruction 1234 in response to determining that the user is signed-in with the first account. The operation instruction 1234 may indicate that an inquiry is to be sent to the user to request authorization to sign-in the user to other account(s) (e.g., second account(s)) of the digital personal assistant.

At step 904, the digital personal assistant is caused to provide an inquiry for the user. The inquiry requests authorization (e.g., for the digital personal assistant) to sign-in the user to second account(s). For instance, the inquiry may request credentials of the user that enable access to the second account(s). In an example implementation, causation logic 1210 causes the digital personal assistant to provide the inquiry for the user. For instance, causation logic 1210 may cause the digital personal assistant to provide the inquiry in response to receipt of the operation instruction 1234 (e.g., in response to the operation instruction 1234 indicating that the inquiry is to be provided).

At step 906, a response to the inquiry is received. For instance, the response may be received from the user. The response indicates that the authorization is granted (e.g., for the digital personal assistant) to sign-in the user to the second account(s). For instance, the response may include the credentials of the user and/or indicate a location from which the credentials may be retrieved. In an example implementation, causation logic 1210 receives the response to the inquiry.

At step 908, the digital personal assistant is caused to sign-in the user to the second account(s) based on at least the response indicating that the authorization is granted. In an example implementation, causation logic 1210 causes the digital personal assistant to sign-in the user to the second account(s).

In an example embodiment, the digital personal assistant may be caused to provide an inquiry for the user, requesting whether content from one or more targets is to be selectively included in the selectively combined content stream. For instance, a first account may be connected to first target(s); a second account may be connected to second target(s), and so on. The digital personal assistant may be caused to inquire whether content from one or more of the first target(s) is to be selectively included in the selectively combined content stream. The digital personal assistant may be caused to inquire whether content from one or more of the second target(s) is to be selectively included in the selectively combined content stream, and so on. The digital personal assistant may be caused to selectively include the content from the first target(s), the content from the second target(s), etc. depending on whether a response to the inquiry indicates that such content is to be selectively included in the selectively combined content stream.

Figure 10:
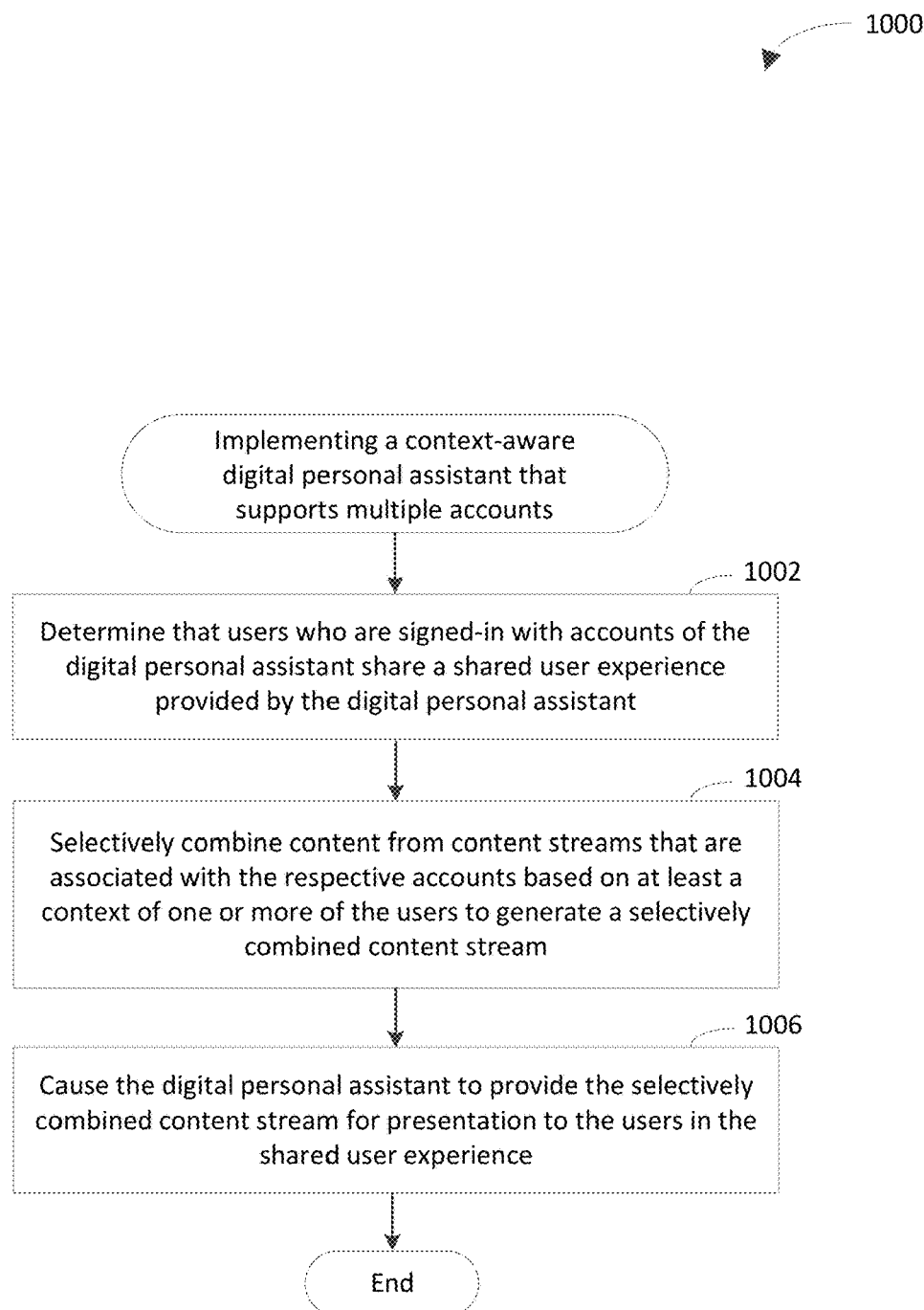

FIG. 10 depicts another flowchart 1000 of an example method for implementing a context-aware digital personal assistant that supports multiple accounts in accordance with an embodiment. As shown in FIG. 10, the method of flowchart 1000 begins at step 1002. In step 1002, a determination is made that users who are signed-in with accounts of the digital personal assistant share a shared (e.g., unified) user experience provided by the digital personal assistant. For instance, the user may be members of a same family, people who work on the same team and/or project, or people in the same room. The users may share the shared user experience at a common (e.g., single) computing device, though the scope of the example embodiments is not limited in this respect. In an example implementation, determination logic 1206 determines that users who are signed-in with accounts of the digital personal assistant share the shared user experience. In accordance with this implementation, determination logic 1206 may generate content information 1224 to indicate that content from content streams 1220 that are associated with the respective accounts is to be selectively combined.

At step 1004, content from content streams that are associated with the respective accounts is selectively combined based on at least a context of one or more of the users to generate a selectively combined content stream. For instance, the content may be automatically selectively combined to generate the selectively combined content stream.

The context of any one or more of the users may be based on any one or more suitable factors. For instance, the context of a user may be derived from (e.g., inferred from) any of such factor(s). Examples of such a factor include but are not limited to a location (e.g., a current or anticipated location of the user), voice signals (e.g., speech or identifying attribute(s) of a voice of the user), an interaction pattern (e.g., of the user with content and/or other user(s)), a scheduled event (e.g., a scheduled event of the user and/or a scheduled event of another person that is statistically likely to have an effect on the user), a communication (e.g., email, text message, short message service (SMS) message, and/or social update), information regarding a network (e.g., a home network or a work network) that is being used by the user, a device (e.g., a type of the device) on which the digital personal assistant is used, an application and/or service that is connected to the device, and one or more people with whom the user interacts. The aforementioned communication may be any suitable communication, including but not limited to a communication to the user, a communication from the user, a communication related to a scheduled event of the user, a communication related to a group (e.g., team) that includes the user, a communication regarding one or more opportunities (e.g., career opportunities, dating opportunities) that are available to the user, and a communication related to an organization with which the user is associated.

In an example implementation, combination logic 1208 selectively combines the content from the content streams 1220 based on at least the context of one or more of the users to generate the selectively combined content stream 1226. For instance, causation logic 1208 may selectively combine the content from the content streams 1220 in response to receipt of the content information 1224 (e.g., in response to the content information 1224 indicating that the content from the content streams 1220 is to be selectively combined).

At step 1006, the digital personal assistant is caused to provide the selectively combined content stream for presentation to the users in the shared user experience. In an example implementation, causation logic 1210 causes the digital personal assistant to provide the selectively combined content stream 1226 for presentation to the users in the shared user experience.

In an example embodiment, determining that the users share the shared user experience at step 1002 includes determining that the users share the shared user experience provided by the digital personal assistant at a shared computing device. For instance, the shared computing device may be mounted on a wall. The shared computing device may be a Surface Hub® device, which is developed and distributed by Microsoft Corporation, though the scope of the example embodiments is not limited in this respect. In accordance with this embodiment, causing the digital personal assistant to provide the selectively combined content stream at step 1006 includes causing the digital personal assistant to provide the selectively combined content stream for presentation to the users in the shared user experience at the shared computing device (e.g., via a display of the shared computing device).

In some example embodiments, one or more steps 1002, 1004, and/or 1006 of flowchart 1000 may not be performed. Moreover, steps in addition to or in lieu of steps 1002, 1004, and/or 1006 may be performed. For instance, in an example embodiment, the method of flowchart 1000 further includes receiving a request from a first user regarding a scheduled event of a second user. For instance, the scheduled event may be identified by a calendar entry of the second user. In an example implementation, combination logic 1208 receives a request 1216 from the first user regarding the scheduled event of the second user. In accordance with this embodiment, selectively combining the content at step 1004 includes including information regarding the scheduled event of the second user in the selectively combined content stream (e.g., in response to receiving the request). In an example implementation, combination logic 1208 may include the information regarding the scheduled event of the second user in the selectively combined content stream 1226.

In an example of this embodiment, a father might inquiry about his son's next soccer practice. For instance, the father might say, "When is Joey's next soccer practice?" The digital personal assistant may show and/or tell the father information (e.g., date, time, location, directions) regarding Joey's next soccer practice by extracting the information from Joey's calendar entry associated with the soccer practice and potentially from other target(s), such as a mapping service (e.g., Google® Maps).

In an aspect of this embodiment, the method of flowchart 1000 further includes receiving authorization from the second user to include designated information regarding the second user in the selectively combined content stream. For instance, combination logic 1208 may receive the authorization form the second user to include the designated information in the selectively combined content stream 1226. In accordance with this aspect, selectively combining the content at step 1004 is performed in response to receiving the authorization. In further accordance with this aspect, the designated information includes the information regarding the scheduled event of the second user.

In an example implementation of this aspect, the method of flowchart 1000 further includes determining that the request is from the first user based on at least stored information that identifies an attribute of the first user matching a detected attribute of the first user. For example, determination logic 1206 may determine that the request 1216 is from the first user based on at least stored information 1228 matching the detected attribute of the first user. In accordance with this example, store 1204 may store the stored information 1228. The stored information 1228 may identify the attribute of the first user. Determination logic 1206 may compare at least the identified attribute in the stored information 1228 to the detected attribute to determine that the identified attribute and the detected attribute are same or substantially same. For instance, determination logic 1206 may determine that difference between the identified attribute and the detected attribute are less than a threshold amount. Determination logic 1206 may determine that the request 1216 is from the user based on at least the difference being less than the threshold amount.

In one example, the attribute may be a voice of the first user. In accordance with this example, the identified attribute of the first user may be identified by detecting a voice signal that includes the request from the first user.

In another example, the attribute may be facial feature(s) of the first user. In accordance with this example, the identified attribute of the first user may be identified by detecting the facial feature(s) of the first user.

In yet another example, the attribute may be a location of the first user. In accordance with this example, the identified attribute may be a detected location of the first user.

In another example embodiment, instances of user-specific information are associated with the respective users. In accordance with this embodiment, the method of flowchart 1000 further includes receiving a request (e.g., a command) from a first user. The request requests the user-specific information. For instance, determination logic 1206 may receive a request 1216. The request 1216 may request the user-specific information. In further accordance with this embodiment, the method of flowchart 1000 further includes determining that the request is from the first user based on at least stored information that identifies an attribute of the first user matching a detected attribute of the first user. For instance, determination logic 1206 may determine that the request 1216 is from the first user based on at least the stored information 1228 that identifies the attribute of the first user matching the detected attribute of the first user. In further accordance with this embodiment, selectively combining the content at step 1004 includes including the instance of the user-specific information that is associated with the first user in the selectively combined content stream in response to determining that the request is from the first user.

In an aspect of this embodiment, the first user may say, "Bring up my calendar," and the digital personal assistant may bring up the calendar of the first user (e.g., rather than the calendar of another user) based on a determination that the request was received from the first user (e.g., based on at least a voice, facial feature(s), and/or a location of the first user).

In another aspect, the first user may say, "Show me my most recent documents," and the digital personal assistant may show the first user the most recent documents of the first user (e.g., rather than the most recent documents of another user) based on a determination that the request was received from the first user.

In yet another example embodiment, each account of the digital personal assistant is associated with one or more respective content sources. In accordance with this embodiment, the method of flowchart 1000 further includes determining that a first user who is signed-in with a first account authorizes first content from one or more first content sources with which the first account is associated to be included in the selectively combined content stream and does not authorize second content from one or more second content sources with which the first account is associated to be included in the selectively combined content stream. For instance, determination logic 1206 may determine that the first user authorizes the first content to be included in the selectively combined content stream 1226 and does not authorize the second content to be included in the selectively combined content stream 1226. In one example, determination logic 1206 may receive authorization information, indicating that the first user authorizes the first content to be included in the selectively combined content stream 1226 and does not authorize the second content to be included in the selectively combined content stream 1226, via an interface from the first user. In another example, the authorization information may be included in stored information 1228. In accordance with this example, determination logic 1206 may retrieve the authorization information from store 1204 to determine whether the first user authorizes the first content and/or the second content to be included in the selectively combined content stream 1226. In further accordance with this embodiment, selectively combining the content at step 1004 includes selectively including the first content but not the second content in the selectively combined content stream based on at least the context of the one or more users in response to determining that the first user authorizes the first content to be included in the selectively combined content stream and does not authorize the second content to be included in the selectively combined content stream.

In an aspect of this embodiment, each user may indicate which content (e.g., type(s) of content) is to be selectively included in the selectively combined content stream from content sources that are associated with an account with which the respective user is signed-in.

FIGS. 11A and 11B depict flowcharts 1100 and 1150 of example methods for facilitating interaction among digital personal assistants in accordance with embodiments. As shown in FIG. 11A, the method of flowchart 1100 begins at step 1102. In step 1102, a determination is made that a first digital personal assistant associated with a first user is authorized to perform an operation on behalf of a second digital personal assistant associated with a second user. For example, the first user may be associated with the first digital personal assistant by being signed-in with the first digital personal assistant. In another example, the second user may be associated with the second digital personal assistant by being signed-in with the second digital personal assistant. The second user is different from the first user. The second digital personal assistant is different from the first digital personal assistant. In an example implementation, determination logic 1206 determines that the first digital personal assistant is authorized to perform the operation on behalf of the second digital personal assistant. Determination logic 1206 may generate an operation instruction 1234 in response to determining that the first digital personal assistant is authorized to perform the operation on behalf of the second digital personal assistant. For example, the operation instruction 1234 may indicate that the operation is to be performed by the first digital personal assistant on behalf of the second digital personal assistant. In accordance with this example, the operation instruction 1234 may instruct causation logic 1210 to cause the first digital personal assistant to perform the operation on behalf of the second digital personal assistant.

At step 1104, the first digital personal assistant is caused to perform the operation on behalf of the second digital personal assistant. In an example implementation, causation logic 1210 causes the first digital personal assistant to perform the operation on behalf of the second digital personal assistant. For instance, causation logic 1210 may cause the first digital personal assistant to perform the operation on behalf of the second digital personal assistant in response to receipt of the operation instruction 1234 (e.g., in response to the operation instruction 1234 indicating that the operation is to be performed by the first digital personal assistant on behalf of the second digital personal assistant).

In an example embodiment, causing the first digital personal assistant to perform the operation on behalf of the second digital personal assistant at step 1104 is performed based on at least a context of the second user. For instance, the first digital personal assistant may be caused to perform the operation on behalf of the second digital personal assistant based on at least the context of the second user satisfying one or more criteria.

The context of the second user may be based on any one or more suitable factors. For instance, the context of the user may be derived from (e.g., inferred from) any of such factor(s). Examples of such a factor include but are not limited to a location (e.g., a current or anticipated location of the second user, a place with which the second user is associated), a time (e.g., a time at which the second user performs an operation, encounters a situation, or is at a location), voice signals (e.g., speech or identifying attribute(s) of a voice of the second user), an interaction pattern (e.g., of the second user with content, device(s), and/or other person(s)), a scheduled event (e.g., a scheduled event of the second user and/or a scheduled event of another person that is statistically likely to have an effect on the second user), a communication (e.g., a conversation), information regarding a network (e.g., a home network or a work network) that is being used by the second user, a device (e.g., a type of the device) on which the second digital personal assistant is used, the second user being engaged (or not being engaged) with a device via which the second digital personal assistant is provided, an application and/or service that is connected to the device, one or more people in the second user's presence, and one or more people with whom the second user interacts and/or has a relationship (e.g., one or more family members or co-workers of the second user).

The aforementioned communication may be any suitable communication, including but not limited to a communication to the second user, a communication from the second user, a communication related to a scheduled event of the second user, a communication related to a group (e.g., team) that includes the second user, a communication regarding one or more opportunities (e.g., career opportunities, dating opportunities) that are available to the second user, and a communication related to an organization with which the second user is associated. The communication may be a message (e.g., a textual message or a verbal message) or a combination of messages. Examples of a message include but are not limited to an email, a text message, a short message service (SMS) message, and a social update. A determination whether the second user is engaged with a device may be made based at least in part on the second user turning on the device or providing a command (e.g., pressing a key, providing a touch, hover, or gesture command, signing-in to the device or an account using the device, moving a cursor of the device) via an interface of the device.

Some other examples of such a factor include but are not limited to the second user working late, the second user working during lunch, the second user being proximate an entity (e.g., a business) while in transit to a destination (e.g., home or work), search history of the second user, browse history of the second user, applications that have been opened by the second user or that are currently opened by the second user, and habit(s) of the second user.

In one example, causing the first digital personal assistant to perform the operation at step 1104 may be performed based on at least the second user being proximate a designated location (e.g., being at the designated location or coming within a threshold distance to the designated location). For example, the operation may pertain to the designated location. In accordance with this example, the first digital personal assistant may be caused to perform the operation at step 1104 may be performed further based on at least the operation pertaining to the designated location.

In another example, causing the first digital personal assistant to perform the operation at step 1104 may be performed based on at least the second user being proximate a designated location (e.g., a home of the second user or a workplace of the second user).

In yet another example, causing the first digital personal assistant to perform the operation at step 1104 may be performed based on at least information conveyed in a conversation of the second user. For instance, a statement by the second user may include the information.

In still another example, causing the first digital personal assistant to perform the operation at step 1104 may be performed based on at least a scheduled event of the second user. In an aspect of this example, causing the first digital personal assistant to perform the operation at step 1104 may be performed based on at least the scheduled event of the second user being scheduled to occur within a threshold duration of time from a current time. For instance, the scheduled event may be identified by a calendar entry of the second user.

In another example, causing the first digital personal assistant to perform the operation at step 1104 may be performed based on at least an interaction pattern of the second user. For instance, causing the first digital personal assistant to perform the operation at step 1104 may be performed based on at least an interaction pattern of the second user with one or more applications, one or more services, and/or one or more web sites.

In yet another example, causing the first digital personal assistant to perform the operation at step 1104 may be performed based on at least the second user being in a presence of one or more specified users.

In still another example, causing the first digital personal assistant to perform the operation at step 1104 may be performed based on at least a search history of the second user, a browse history of the second user, and/or a habit of the second user.

In another example, the second user is signed-in with a plurality of accounts of the second digital personal assistant. The plurality of accounts includes at least a first account and a second account. In accordance with this example, causing the first digital personal assistant to perform the operation at step 1104 may be performed based on at least the second user changing from a first context associated with the first account to a second context associated with the second account.

In yet another example, causing the first digital personal assistant to perform the operation at step 1104 may be performed based on at least a location of the second user.

In still another example, causing the first digital personal assistant to perform the operation at step 1104 may be performed based on at least communication associated with the second user.

In another example, causing the first digital personal assistant to perform the operation at step 1104 may be performed based on at least the second user being within a specified proximity to one or more specified users.

In another example, causing the first digital personal assistant to perform the operation at step 1104 may be performed based on at least one or more applications that are opened by the second user.

In some example embodiments, one or more steps 1102 and/or 1104 of flowchart 1100 may not be performed. Moreover, steps in addition to or in lieu of steps 1102 and/or 1104 may be performed.

As shown in FIG. 11B, the method of flowchart 1150 begins at step 1152. In step 1152, a determination is made that a first digital personal assistant associated with a first user is authorized to delegate an operation to a second digital personal assistant associated with a second user. For example, the first user may be associated with the first digital personal assistant by being signed-in with the first digital personal assistant. In another example, the second user may be associated with the second digital personal assistant by being signed-in with the second digital personal assistant. The second user is different from the first user. The second digital personal assistant is different from the first digital personal assistant. In an example implementation, determination logic 1206 determines that the first digital personal assistant is authorized to delegate the operation to the second digital personal assistant. Determination logic 1206 may generate an operation instruction 1234 in response to determining that the first digital personal assistant is authorized to delegate the operation to the second digital personal assistant. For example, the operation instruction 1234 may indicate that the first digital personal assistant is to delegate the operation to the second digital personal assistant. In accordance with this example, the operation instruction 1234 may instruct causation logic 1210 to cause the first digital personal assistant to delegate the operation to the second digital personal assistant.

At step 1154, the first digital personal assistant is caused to delegate the operation to the second digital personal assistant. For example, the second digital personal assistant rather than the first digital personal assistant may be caused to perform the operation. In accordance with this example, the first digital personal assistant may instruct the second digital personal assistant to perform the operation (e.g., rather than performing the operation itself). In an example implementation, causation logic 1210 causes the first digital personal assistant to delegate the operation to the second digital personal assistant. For instance, causation logic 1210 may cause the first digital personal assistant to delegate the operation to the second digital personal assistant in response to receipt of the operation instruction 1234 (e.g., in response to the operation instruction 1234 indicating that the first digital personal assistant is to delegate the operation to the second digital personal assistant).

In an example embodiment, causing the first digital personal assistant to delegate the operation to the second digital personal assistant at step 1154 is performed based on at least a context of the second user. For instance, the first digital personal assistant may be caused to delegate the operation to the second digital personal assistant based on at least the context of the second user satisfying one or more criteria. The context of the second user may be based on any one or more suitable factors, such as any one or more of the factors described above with reference to flowchart 1100 of FIG. 11A.

In one example, causing the first digital personal assistant to delegate the operation at step 1154 may be performed based on at least the second user being proximate a designated location (e.g., being at the designated location or coming within a threshold distance to the designated location).

In another example, causing the first digital personal assistant to delegate the operation at step 1154 may be performed based on at least the second user being proximate a designated location (e.g., a home of the second user or a workplace of the second user).

In yet another example, causing the first digital personal assistant to delegate the operation at step 1154 may be performed based on at least information conveyed in a conversation of the second user. For instance, a statement by the second user may include the information.

In still another example, causing the first digital personal assistant to delegate the operation at step 1154 may be performed based on at least a scheduled event of the second user. In an aspect of this example, causing the first digital personal assistant to perform the operation at step 1104 may be performed based on at least the scheduled event of the second user being scheduled to occur within a threshold duration of time from a current time. For instance, the scheduled event may be identified by a calendar entry of the second user.

In another example, causing the first digital personal assistant to delegate the operation at step 1154 may be performed based on at least an interaction pattern of the second user. For instance, causing the first digital personal assistant to delegate the operation at step 1154 may be performed based on at least an interaction pattern of the second user with one or more applications, one or more services, and/or one or more web sites.

In yet another example, causing the first digital personal assistant to delegate the operation at step 1154 may be performed based on at least the second user being in a presence of one or more specified users.

In still another example, causing the first digital personal assistant to delegate the operation at step 1104 may be performed based on at least a search history of the second user, a browse history of the second user, and/or a habit of the second user.

In another example, the second user is signed-in with a plurality of accounts of the second digital personal assistant. The plurality of accounts includes at least a first account and a second account. In accordance with this example, causing the first digital personal assistant to delegate the operation at step 1154 may be performed based on at least the second user changing from a first context associated with the first account to a second context associated with the second account.

In yet another example, causing the first digital personal assistant to delegate the operation at step 1154 may be performed based on at least a location of the second user.

In still another example, causing the first digital personal assistant to delegate the operation at step 1154 may be performed based on at least communication associated with the second user.

In another example, causing the first digital personal assistant to delegate the operation at step 1154 may be performed based on at least the second user being within a specified proximity to one or more specified users.

In another example, causing the first digital personal assistant to delegate the operation at step 1154 may be performed based on at least one or more applications that are opened by the second user.

In some example embodiments, one or more steps 1152 and/or 1154 of flowchart 1150 may not be performed. Moreover, steps in addition to or in lieu of steps 1152 and/or 1154 may be performed.

It will be recognized that computing system 1200 may not include one or more of context-aware assistant logic 1202, store 1204, determination logic 1206, combination logic 1208, causation logic 1210, assignment logic 1212, and/or selection logic 1214. Furthermore, computing system 1200 may include components in addition to or in lieu of context-aware assistant logic 1202, store 1204, determination logic 1206, combination logic 1208, causation logic 1210, assignment logic 1212, and/or selection logic 1214.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any one or more of digital personal assistants 108A-108M, context-aware assistant logic 110, context-aware assistant logic 1202, determination logic 1206, combination logic 1208, causation logic 1210, assignment logic 1212, selection logic 1214, flowchart 200, flowchart 300, flowchart 400, flowchart 500, flowchart 600, flowchart 700, flowchart 800, flowchart 900, flowchart 1000, flowchart 1100, and/or flowchart 1150 may be implemented in hardware, software, firmware, or any combination thereof.

For example, any one or more of digital personal assistants 108A-108M, context-aware assistant logic 110, context-aware assistant logic 1202, determination logic 1206, combination logic 1208, causation logic 1210, assignment logic 1212, selection logic 1214, flowchart 200, flowchart 300, flowchart 400, flowchart 500, flowchart 600, flowchart 700, flowchart 800, flowchart 900, flowchart 1000, flowchart 1100, and/or flowchart 1150 may be implemented, at least in part, as computer program code configured to be executed in one or more processors.

In another example, any one or more of digital personal assistants 108A-108M, context-aware assistant logic 110, context-aware assistant logic 1202, determination logic 1206, combination logic 1208, causation logic 1210, assignment logic 1212, selection logic 1214, flowchart 200, flowchart 300, flowchart 400, flowchart 500, flowchart 600, flowchart 700, flowchart 800, flowchart 900, flowchart 1000, flowchart 1100, and/or flowchart 1150 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In a first example method of implementing a context-aware digital personal assistant that supports multiple accounts using at least one element that includes at least one of (a) one or more processors, (b) hardware logic, or (c) electrical circuitry, a determination is made that a user is signed-in with a plurality of accounts of the digital personal assistant. Content from a plurality of content streams that are associated with the plurality of respective accounts is selectively combined, using the at least one element, based on at least a context of the user to generate a selectively combined content stream. The digital personal assistant is caused to provide the selectively combined content stream for presentation to the user.

In a first aspect of the first example method, one or more first content streams of the plurality of content streams are associated with one or more respective first accounts of the plurality of accounts. In accordance with the first aspect, one or more second content streams of the plurality of content streams are associated with one or more respective second accounts of the plurality of accounts. In further accordance with the first aspect, the first example method further comprises determining that the context of the user changes from a first context to a second context. In further accordance with the first aspect, the first example method further comprises assigning a first relevance weight to first content from the one or more first content streams in response to determining that the context of the user changes from the first context to the second context. In further accordance with the first aspect, the first example method further comprises assigning a second relevance weight to second content from the one or more second content streams in response to determining that the context of the user changes from the first context to the second context. The second relevance weight is greater than the first relevance weight. In further accordance with the first aspect, selectively combining the content comprises selectively including the first content and the second content in the selectively combined content stream based on at least the first relevance weight and the second relevance weight.

In a second aspect of the first example method, the first example method further comprises determining that the context of the user is a work context associated with work of the user. In accordance with the second aspect, the first example method further comprises assigning a first relevance weight to first content that is associated with the work of the user from the plurality of content streams. In further accordance with the second aspect, the first example method further comprises assigning a second relevance weight to second content that is not associated with the work of the user from the plurality of content streams. The first relevance weight is greater than the second relevance weight. In further accordance with the second aspect, selectively combining the content comprises selectively including the first content and the second content in the selectively combined content stream based on at least the first relevance weight and the second relevance weight. The second aspect of the first example method may be implemented in combination with the first aspect of the first example method, though the example embodiments are not limited in this respect.

In a third aspect of the first example method, the first example method further comprises determining that the context of the user is a personal context associated with a personal life of the user. In accordance with the third aspect, the first example method further comprises assigning a first relevance weight to first content that is not work-related from the plurality of content streams. In further accordance with the third aspect, the first example method further comprises assigning a second relevance weight to second content that is work-related from the plurality of content streams, the first relevance weight being greater than the second relevance weight. In further accordance with the third aspect, selectively combining the content comprises selectively including the first content and the second content in the selectively combined content stream based on at least the first relevance weight and the second relevance weight. The third aspect of the first example method may be implemented in combination with the first and/or second aspect of the first example method, though the example embodiments are not limited in this respect.

In a fourth aspect of the first example method, the first example method further comprises determining that the context of the user is to change from a first context to a second context based on satisfaction of one or more criteria. In accordance with the fourth aspect, the first example method further comprises causing the digital personal assistant to provide a notification to the user regarding the first context or the second context in response to determining that the context of the user is to change from the first context to the second context. The fourth aspect of the first example method may be implemented in combination with the first, second, and/or third aspect of the first example method, though the example embodiments are not limited in this respect.

In a fifth aspect of the first example method, determining that the user is signed-in with the plurality of accounts comprises determining that the user is signed-in with a plurality of work accounts that are associated with a plurality of respective attributes associated with work of the user, the plurality of work accounts including at least a first work account and a second work account. In accordance with the fifth aspect, selectively combining the content comprises selectively combining first content from a first work-related content stream associated with the first work account and second content from a second work-related content stream associated with the second work account based on at least the context of the user to generate the selectively combined content stream. The fifth aspect of the first example method may be implemented in combination with the first, second, third, and/or fourth aspect of the first example method, though the example embodiments are not limited in this respect.

In a sixth aspect of the first example method, determining that the user is signed-in with the plurality of accounts comprises determining that the user is signed-in with a plurality of personal accounts that are associated with a plurality of respective attributes associated with a personal life of the user. The plurality of personal accounts includes at least a first personal account and a second personal account. In accordance with the sixth aspect, selectively combining the content comprises selectively combining first content from a first content stream associated with the first personal account and second content from a second content stream associated with the second personal account based on at least the context of the user to generate the selectively combined content stream. The sixth aspect of the first example method may be implemented in combination with the first, second, third, fourth, and/or fifth aspect of the first example method, though the example embodiments are not limited in this respect.

In a seventh aspect of the first example method, the first example method further comprises determining that the user has a first type of relationship with a specified person in a first context of the user. In accordance with the seventh aspect, the first example method further comprises determining that the user has a second type of relationship with the specified person that is different from the first type in a second context of the user. In further accordance with the seventh aspect, the first example method further comprises selecting between a first manner and a second manner in which to communicate with the specified person on behalf of the user depending on whether the context of the user is the first context or the second context. The first manner corresponds to the context of the user being the first context. The second manner corresponds to the context of the user being the second context. The seventh aspect of the first example method may be implemented in combination with the first, second, third, fourth, fifth, and/or sixth aspect of the first example method, though the example embodiments are not limited in this respect.

In an eighth aspect of the first example method, the plurality of content streams includes at least a first content stream, a second content stream, and a third content stream associated with a first account, a second account, and a third account, respectively, of the plurality of accounts. In accordance with the eighth aspect, selectively combining the content comprises selectively combining the content (a) from at least the first and second content streams and not from the third content stream or (b) from at least the first and third content streams and not from the second content stream depending on whether the context of the user is a first context or a second context. The first context corresponds to the content being selected from at least the first and second content streams and not from the third content stream. The second context corresponds to the content being selected from at least the first and third content streams and not from the second content stream. The eighth aspect of the first example method may be implemented in combination with the first, second, third, fourth, fifth, sixth, and/or seventh aspect of the first example method, though the example embodiments are not limited in this respect.

In a ninth aspect of the first example method, the first example method further comprises determining that the user accesses the digital personal assistant via a first device of a plurality of devices that are associated with the user. In accordance with the ninth aspect, the first example method further comprises determining that a first content stream associated with a first account is not accessible via the first device. The first content stream is included in the plurality of content streams. The first account is included in the plurality of accounts. In further accordance with the ninth aspect, the first example method further comprises determining that the first content stream is accessible via a second device of the plurality of devices. In further accordance with the ninth aspect, the first example method further comprises causing the digital personal assistant to notify the user that the first content stream is accessible via the second device in response to determining that the first content stream is not accessible via the first device and further in response to determining that the first content stream is accessible via the second device. The ninth aspect of the first example method may be implemented in combination with the first, second, third, fourth, fifth, sixth, seventh, and/or eighth aspect of the first example method, though the example embodiments are not limited in this respect.

In an example of the ninth aspect of the first example method, determining that the first content stream is not accessible via the first device comprises determining that the first content stream is not accessible via the first device based on at least the context of the user.

In a tenth aspect of the first example method, the first example method further comprises determining that a first content stream associated with a first account is not accessible while the user is in the first context. The first content stream is included in the plurality of content streams. The first account is included in the plurality of accounts. In accordance with the tenth aspect, the first example method further comprises causing the digital personal assistant to notify the user that the first content stream is not accessible while the user is in the first context in response to determining that the first content stream is not accessible while the user is in the first context. The tenth aspect of the first example method may be implemented in combination with the first, second, third, fourth, fifth, sixth, seventh, eighth, and/or ninth aspect of the first example method, though the example embodiments are not limited in this respect.

In an example of the tenth aspect of the first example method, the first example method further comprises determining that the first content stream is accessible while the user is in a context other than the first context. In accordance with this example of the tenth aspect, causing the digital personal assistant to notify the user that the first content stream is not accessible while the user is in the first context comprises causing the digital personal assistant to notify the user that the first content stream is accessible in a context other than the first context.

In an eleventh aspect of the first example method, the first example method further comprises determining that the user has a first commitment scheduled in a first account of the plurality of accounts. In accordance with the eleventh aspect, the first example method further comprises determining that the user has a second commitment scheduled in a second account of the plurality of accounts. The second commitment overlaps in time with the first commitment. In further accordance with the eleventh aspect, the first example method further comprises causing the digital personal assistant to reschedule the first commitment in the first account to accommodate the second commitment in the second account. The eleventh aspect of the first example method may be implemented in combination with the first, second, third, fourth, fifth, sixth, seventh, eighth, ninth, and/or tenth aspect of the first example method, though the example embodiments are not limited in this respect.

In an example of the eleventh aspect of the first example method, the first example method further comprises determining that the user is more likely to reschedule the first commitment than to reschedule the second commitment based on at least one of historical information or a preference associated with the user. In accordance with the eleventh aspect, causing the digital personal assistant to reschedule the first commitment comprises causing the digital personal assistant to reschedule the first commitment in response to determining that the user is more likely to reschedule the first commitment than to reschedule the second commitment.

In an implementation of this example of the eleventh aspect, the first example method further comprises causing the digital personal assistant to provide an inquiry for the user, the inquiry requesting authorization to reschedule the first commitment. In accordance with this implementation, the first example method further comprises receiving a response to the inquiry, the response indicating that the authorization is granted to reschedule the first commitment. In further accordance with this implementation, causing the digital personal assistant to reschedule the first commitment comprises causing the digital personal assistant to reschedule the first commitment further in response to receiving the response to the inquiry.

In a twelfth aspect of the first example method, determining that the user is signed-in with the plurality of accounts comprises determining that the user is signed-in with a first account of the plurality of accounts. In accordance with the twelfth aspect, determining that the user is signed-in with the plurality of accounts further comprises causing the digital personal assistant to provide an inquiry for the user, the inquiry requesting authorization to sign-in the user to one or more second accounts of the plurality of accounts. In further accordance with the twelfth aspect, determining that the user is signed-in with the plurality of accounts further comprises receiving a response to the inquiry. The response indicates that the authorization is granted to sign-in the user to the one or more second accounts. In further accordance with the twelfth aspect, determining that the user is signed-in with the plurality of accounts further comprises causing the digital personal assistant to sign-in the user to the one or more second accounts based on at least the response indicating that the authorization is granted. The twelfth aspect of the first example method may be implemented in combination with the first, second, third, fourth, fifth, sixth, seventh, eighth, ninth, tenth, and/or eleventh aspect of the first example method, though the example embodiments are not limited in this respect.

In a thirteenth aspect of the first example method, the first example method further comprises causing the digital personal assistant to provide an inquiry for the user, the inquiry indicating at least one data source that is associated with a first account of the plurality of accounts. The inquiry requests authorization to include first content from the at least one data source in the content stream that is associated with the first account. In accordance with the thirteenth aspect, the first example method further comprises receiving a response to the inquiry. The response indicates that the authorization is granted to include the first content from the at least one data source in the content stream that is associated with the first account. In further accordance with the thirteenth aspect, selectively combining the content comprises selectively including the first content in the selectively combined content stream based on at least the response indicating that the authorization is granted to include the first content from the at least one data source in the content stream that is associated with the first account. The thirteenth aspect of the first example method may be implemented in combination with the first, second, third, fourth, fifth, sixth, seventh, eighth, ninth, tenth, eleventh, and/or twelfth aspect of the first example method, though the example embodiments are not limited in this respect.

In a fourteenth aspect of the first example method, selectively combining the content comprises not including designated content in the selectively combined content stream based at least in part on a privacy policy indicating that the designated content is not to be included in the selectively combined content stream when the user is in the context. The fourteenth aspect of the first example method may be implemented in combination with the first, second, third, fourth, fifth, sixth, seventh, eighth, ninth, tenth, eleventh, twelfth, and/or thirteenth aspect of the first example method, though the example embodiments are not limited in this respect.

In a fifteenth aspect of the first example method, a privacy policy indicates that a third-party is authorized to view a portion of the selectively combined content stream. In accordance with the fifteenth aspect, the privacy policy indicates that the third-party is not authorized to view designated content that is included in the selectively combined content stream. In further accordance with the fifteenth aspect, the first example method further comprises causing the portion of the selectively combined content stream and not the designated content to be viewable by the third-party based at least in part on the privacy policy indicating that the third party is authorized to view the portion and that the third-party is not authorized to view the designated content. The fifteenth aspect of the first example method may be implemented in combination with the first, second, third, fourth, fifth, sixth, seventh, eighth, ninth, tenth, eleventh, twelfth, thirteenth, and/or fourteenth aspect of the first example method, though the example embodiments are not limited in this respect.

In a second example method of implementing a context-aware digital personal assistant that supports multiple accounts using at least one element that includes at least one of (a) one or more processors, (b) hardware logic, or (c) electrical circuitry, a determination is made that a plurality of users who are signed-in with a plurality of accounts of the digital personal assistant share a shared user experience provided by the digital personal assistant. Content from a plurality of content streams that are associated with the plurality of respective accounts is selectively combined, using the at least one element, based on at least a context of one or more users of the plurality of users to generate a selectively combined content stream. The digital personal assistant is caused to provide the selectively combined content stream for presentation to the plurality of users in the shared user experience.

In a first aspect of the second example method, the second example method further comprises receiving a request from a first user of the plurality of users regarding a scheduled event of a second user of the plurality of users. In accordance with the first aspect, selectively combining the content comprises including information regarding the scheduled event of the second user in the selectively combined content stream in response to receiving the request.

In an example of the first aspect of the second example method, the second example method further comprises determining that the request is from the first user based on at least stored information that identifies an attribute of the first user matching a detected attribute of the first user.

In another example of the first aspect of the second example method, the second example method further comprises checking a privacy policy, which distinguishes between first information that is authorized to be included in the selectively combined content stream and second information that is not authorized to be included in the selectively combined content stream, to determine that the information regarding the scheduled event of the first user is included in the first information. In accordance with this example, selectively combining the content comprises including the information regarding the scheduled event of the first user in the selectively combined content stream further in response to determining that the information regarding the scheduled event of the first user is included in the first information.

In a second aspect of the second example method, a plurality of instances of user-specific information is associated with the plurality of respective users. In accordance with the second aspect, the second example method further comprises receiving a request from a first user of the plurality of users. The request requests the user-specific information. In further accordance with the second aspect, the second example method further comprises determining that the request is from the first user based on at least stored information that identifies an attribute of the first user matching a detected attribute of the first user. In further accordance with the second aspect, selectively combining the content comprises including the instance of the user-specific information that is associated with the first user in the selectively combined content stream in response to determining that the request is from the first user. The second aspect of the second example method may be implemented in combination with the first aspect of the second example method, though the example embodiments are not limited in this respect.

In a third aspect of the second example method, determining that the plurality of users share the shared user experience comprises determining that the plurality of users share the shared user experience provided by the digital personal assistant at a shared computing device. In accordance with the third aspect, causing the digital personal assistant to provide the selectively combined content stream comprises causing the digital personal assistant to provide the selectively combined content stream for presentation to the plurality of users in the shared user experience at the shared computing device. The third aspect of the second example method may be implemented in combination with the first and/or second aspect of the second example method, though the example embodiments are not limited in this respect.

In a fourth aspect of the second example method, each account of the digital personal assistant is associated with one or more respective content sources. In accordance with the fourth aspect, the second example method further comprises determining that a first user who is signed-in with a first account of the plurality of accounts authorizes first content from one or more first content sources with which the first account is associated to be included in the selectively combined content stream and does not authorize second content from one or more second content sources with which the first account is associated to be included in the selectively combined content stream. In further accordance with the fourth aspect, selectively combining the content comprises selectively including the first content but not the second content in the selectively combined content stream based on at least the context of the one or more users in response to determining that the first user authorizes the first content to be included in the selectively combined content stream and does not authorize the second content to be included in the selectively combined content stream. The fourth aspect of the second example method may be implemented in combination with the first, second, and/or third aspect of the second example method, though the example embodiments are not limited in this respect.

In a third example method of facilitating interaction among digital personal assistants using at least one element that includes at least one of (a) one or more processors, (b) hardware logic, or (c) electrical circuitry, a determination is made whether a first digital personal assistant associated with a first user is authorized to perform an operation on behalf of a second digital personal assistant associated with a second user who is different from the first user. The second digital personal assistant is different from the first digital personal assistant. The first digital personal assistant is caused to perform the operation on behalf of the second digital personal assistant, using the at least one element, in response to determining that the first digital personal assistant is authorized to perform the operation on behalf of the second digital personal assistant.

In a first aspect of the third example method, causing the first digital personal assistant to perform the operation on behalf of the second digital personal assistant comprises causing the first digital personal assistant to perform the operation on behalf of the second digital personal assistant based on at least a context of the second user.

In an example of the first aspect of the third example method, causing the first digital personal assistant to perform the operation comprises causing the first digital personal assistant to perform the operation on behalf of the second digital personal assistant based on at least the second user being proximate a designated location.

In another example of the first aspect of the third example method, causing the first digital personal assistant to perform the operation comprises causing the first digital personal assistant to perform the operation on behalf of the second digital personal assistant based on at least information conveyed in a conversation of the second user.

In yet another example of the first aspect of the third example method, causing the first digital personal assistant to perform the operation comprises causing the first digital personal assistant to perform the operation on behalf of the second digital personal assistant based on at least a scheduled event of the second user being scheduled to occur within a threshold duration of time from a current time.

In still another example of the first aspect of the third example method, causing the first digital personal assistant to perform the operation comprises causing the first digital personal assistant to perform the operation on behalf of the second digital personal assistant based on at least an interaction pattern of the second user with at least one of (a) one or more applications or (b) one or more services.

In another example of the first aspect of the third example method, causing the first digital personal assistant to perform the operation comprises causing the first digital personal assistant to perform the operation on behalf of the second digital personal assistant based on at least the second user being in a presence of one or more specified users.

In yet another example of the first aspect of the third example method, causing the first digital personal assistant to perform the operation comprises causing the first digital personal assistant to perform the operation on behalf of the second digital personal assistant based on at least one of a search history of the second user, a browse history of the second user, or a habit of the second user.

In still another example of the first aspect of the third example method, the second user is signed-in with a plurality of accounts of the second digital personal assistant. The plurality of accounts includes at least a first account and a second account. In accordance with this example, causing the first digital personal assistant to perform the operation comprises causing the first digital personal assistant to perform the operation on behalf of the second digital personal assistant based on at least the second user changing from a first context associated with the first account to a second context associated with the second account.

In a fourth example method of facilitating interaction among digital personal assistants using at least one element that includes at least one of (a) one or more processors, (b) hardware logic, or (c) electrical circuitry, a determination is made whether a first digital personal assistant associated with a first user is authorized to delegate an operation to a second digital personal assistant associated with a second user who is different from the first user. The second digital personal assistant is different from the first digital personal assistant. The first digital personal assistant is caused to delegate the operation to the second digital personal assistant, using the at least one element, in response to determining that the first digital personal assistant is authorized to delegate the operation to the second digital personal assistant.

In a first aspect of the fourth example method, causing the first digital personal assistant to delegate the operation to the second digital personal assistant comprises causing the first digital personal assistant to delegate the operation to the second digital personal assistant based on at least a context of the second user.

In an example of the first aspect of the fourth example method, causing the first digital personal assistant to delegate the operation comprises causing the first digital personal assistant to delegate the operation to the second digital personal assistant based on at least a location of the second user.

In another example of the first aspect of the fourth example method, causing the first digital personal assistant to delegate the operation comprises causing the first digital personal assistant to delegate the operation to the second digital personal assistant based on at least communication associated with the second user.

In yet another example of the first aspect of the fourth example method, causing the first digital personal assistant to delegate the operation comprises causing the first digital personal assistant to delegate the operation to the second digital personal assistant based on at least a scheduled event of the second user.

In still another example of the first aspect of the fourth example method, causing the first digital personal assistant to delegate the operation comprises causing the first digital personal assistant to delegate the operation to the second digital personal assistant based on at least one of an interaction pattern of the second user or a habit of the second user.

In another example of the first aspect of the fourth example method, causing the first digital personal assistant to delegate the operation comprises causing the first digital personal assistant to delegate the operation to the second digital personal assistant based on at least the second user being within a specified proximity to one or more specified users.

In yet another example of the first aspect of the fourth example method, causing the first digital personal assistant to delegate the operation comprises causing the first digital personal assistant to delegate the operation to the second digital personal assistant based on at least one or more applications that are opened by the second user.

In still another example of the first aspect of the fourth example method, causing the first digital personal assistant to delegate the operation comprises causing the first digital personal assistant to delegate the operation to the second digital personal assistant based on at least one of a search history of the second user or a browse history of the second user.

In another example of the first aspect of the fourth example method, the second user is signed-in with a plurality of accounts of the second digital personal assistant. The plurality of accounts includes at least a first account and a second account. In accordance with this example, causing the first digital personal assistant to delegate the operation comprises causing the first digital personal assistant to delegate the operation to the second digital personal assistant based on at least the second user changing from a first context associated with the first account to a second context associated with the second account.

A first example system to implement a context-aware digital personal assistant that supports multiple accounts comprises at least one element comprising at least one of (a) a processor, (b) hardware logic, or (c) electrical circuitry. The first example system further comprises combination logic, implemented using the at least one element, configured to selectively combine content from a plurality of content streams that are associated with a plurality of respective accounts of the digital personal assistant based on at least a context of a user who is signed-in with the plurality of accounts to generate a selectively combined content stream. The first example system further comprises causation logic, implemented using the at least one element, configured to cause the digital personal assistant to provide the selectively combined content stream for presentation to the user.

In a first aspect of the first example system, one or more first content streams of the plurality of content streams are associated with one or more respective first accounts of the plurality of accounts. In accordance with the first aspect, one or more second content streams of the plurality of content streams are associated with one or more respective second accounts of the plurality of accounts. In further accordance with the first aspect, the first example system further comprises determination logic configured to determine whether the context of the user changes from a first context to a second context. In further accordance with the first aspect, the first example system further comprises assignment logic configured to assign a first relevance weight to first content from the one or more first content streams in response to a determination that the context of the user changes from the first context to the second context. The assignment logic is further configured to assign a second relevance weight to second content from the one or more second content streams in response to the determination that the context of the user changes from the first context to the second context. The second relevance weight is greater than the first relevance weight. In further accordance with the first aspect, the combination logic is configured to selectively include the first content and the second content in the selectively combined content stream based on at least the first relevance weight and the second relevance weight.

In a second aspect of the first example system, the context of the user is a work context associated with work of the user. In accordance with the second aspect, the first example system further comprises assignment logic configured to assign a first relevance weight to first content that is associated with the work of the user from the plurality of content streams. The assignment logic is further configured to assign a second relevance weight to second content that is not associated with the work of the user from the plurality of content streams. The first relevance weight is greater than the second relevance weight. In further accordance with the second aspect, the combination logic is configured to selectively include the first content and the second content in the selectively combined content stream based on at least the first relevance weight and the second relevance weight. The second aspect of the first example system may be implemented in combination with the first aspect of the first example system, though the example embodiments are not limited in this respect.

In a third aspect of the first example system, the context of the user is a personal context associated with a personal life of the user. In accordance with the third aspect, the first example system further comprises assignment logic configured to assign a first relevance weight to first content that is not work-related from the plurality of content streams. The assignment logic is further configured to assign a second relevance weight to second content that is work-related from the plurality of content streams. The first relevance weight is greater than the second relevance weight. In further accordance with the third aspect, the combination logic is configured to selectively include the first content and the second content in the selectively combined content stream based on at least the first relevance weight and the second relevance weight. The third aspect of the first example system may be implemented in combination with the first and/or second aspect of the first example system, though the example embodiments are not limited in this respect.

In a fourth aspect of the first example system, the first example system further comprises determination logic configured to determine whether the context of the user is to change from a first context to a second context based on whether one or more criteria are satisfied. In accordance with the fourth aspect, the causation logic is configured to cause the digital personal assistant to provide a notification to the user regarding the first context or the second context in response to a determination that the context of the user is to change from the first context to the second context. The fourth aspect of the first example system may be implemented in combination with the first, second, and/or third aspect of the first example system, though the example embodiments are not limited in this respect.

In a fifth aspect of the first example system, the plurality of accounts includes a plurality of work accounts that are associated with a plurality of respective attributes associated with work of the user. The plurality of work accounts includes at least a first work account and a second work account. In accordance with the fifth aspect, the combination logic is configured to selectively combine first content from a first work-related content stream associated with the first work account and second content from a second work-related content stream associated with the second work account based on at least the context of the user to generate the selectively combined content stream. The fifth aspect of the first example system may be implemented in combination with the first, second, third, and/or fourth aspect of the first example system, though the example embodiments are not limited in this respect.

In a sixth aspect of the first example system, the plurality of accounts includes a plurality of personal accounts that are associated with a plurality of respective attributes associated with a personal life of the user. The plurality of personal accounts includes at least a first personal account and a second personal account. In accordance with the sixth aspect, the combination logic is configured to selectively combine first content from a first content stream associated with the first personal account and second content from a second content stream associated with the second personal account based on at least the context of the user to generate the selectively combined content stream. The sixth aspect of the first example system may be implemented in combination with the first, second, third, fourth, and/or fifth aspect of the first example system, though the example embodiments are not limited in this respect.

In a seventh aspect of the first example system, the user has a first type of relationship with a specified person in a first context of the user. In accordance with the seventh aspect, the user has a second type of relationship with the specified person that is different from the first type in a second context of the user. In further accordance with the seventh aspect, the first example system further comprises selection logic configured to select between a first manner and a second manner in which to communicate with the specified person on behalf of the user depending on whether the context of the user is the first context or the second context. The first manner corresponds to the context of the user being the first context. The second manner corresponds to the context of the user being the second context. The seventh aspect of the first example system may be implemented in combination with the first, second, third, fourth, fifth, and/or sixth aspect of the first example system, though the example embodiments are not limited in this respect.

In an eighth aspect of the first example system, the plurality of content streams includes at least a first content stream, a second content stream, and a third content stream associated with a first account, a second account, and a third account, respectively, of the plurality of accounts. In accordance with the eighth aspect, the combination logic is configured to selectively combine the content (a) from at least the first and second content streams and not from the third content stream or (b) from at least the first and third content streams and not from the second content stream depending on whether the context of the user is a first context or a second context. The first context corresponds to the content being selected from at least the first and second content streams and not from the third content stream. The second context corresponds to the content being selected from at least the first and third content streams and not from the second content stream. The eighth aspect of the first example system may be implemented in combination with the first, second, third, fourth, fifth, sixth, and/or seventh aspect of the first example system, though the example embodiments are not limited in this respect.

In a ninth aspect of the first example system, the first example system further comprises determination logic configured to determine that the user accesses the digital personal assistant via a first device of a plurality of devices that are associated with the user. In accordance with the ninth aspect, the determination logic is further configured to determine that a first content stream associated with a first account is not accessible via the first device. In further accordance with the ninth aspect, the first content stream is included in the plurality of content streams. In further accordance with the ninth aspect, the first account is included in the plurality of accounts. In further accordance with the ninth aspect, the determination logic is further configured to determine that the first content stream is accessible via a second device of the plurality of devices. In further accordance with the ninth aspect, the causation logic is configured to cause the digital personal assistant to notify the user that the first content stream is accessible via the second device in response to a determination that the first content stream is not accessible via the first device and further in response to a determination that the first content stream is accessible via the second device. The ninth aspect of the first example system may be implemented in combination with the first, second, third, fourth, fifth, sixth, seventh, and/or eighth aspect of the first example system, though the example embodiments are not limited in this respect.

In an example of the ninth aspect of the first example system, the determination logic is configured to determine that the first content stream is not accessible via the first device based on at least the context of the user.

In a tenth aspect of the first example system, the first example system further comprises determination logic configured to determine that a first content stream associated with a first account is not accessible while the user is in the first context. In accordance with the tenth aspect, the first content stream is included in the plurality of content streams. In further accordance with the tenth aspect, the first account is included in the plurality of accounts. In further accordance with the tenth aspect, the causation logic is configured to cause the digital personal assistant to notify the user that the first content stream is not accessible while the user is in the first context in response to a determination that the first content stream is not accessible while the user is in the first context. The tenth aspect of the first example system may be implemented in combination with the first, second, third, fourth, fifth, sixth, seventh, eighth, and/or ninth aspect of the first example system, though the example embodiments are not limited in this respect.

In an example of the tenth aspect of the first example system, the determination logic is configured to determine that the first content stream is accessible while the user is in a context other than the first context. In accordance with this example, the causation logic is configured to cause the digital personal assistant to notify the user that the first content stream is accessible in a context other than the first context.

In an eleventh aspect of the first example system, the first example system further comprises determination logic configured to determine that the user has a first commitment scheduled in a first account of the plurality of accounts. The determination logic is further configured to determine that the user has a second commitment scheduled in a second account of the plurality of accounts. The second commitment overlaps in time with the first commitment. In accordance with the eleventh aspect, the causation logic is configured to cause the digital personal assistant to reschedule the first commitment in the first account to accommodate the second commitment in the second account. The eleventh aspect of the first example system may be implemented in combination with the first, second, third, fourth, fifth, sixth, seventh, eighth, ninth, and/or tenth aspect of the first example system, though the example embodiments are not limited in this respect.

In an example of the eleventh aspect of the first example system, the first example system further comprises determination logic configured to determine that the user is more likely to reschedule the first commitment than to reschedule the second commitment based on at least one of historical information or a preference associated with the user. In accordance with this example, the causation logic is configured to cause the digital personal assistant to reschedule the first commitment in response to a determination that the user is more likely to reschedule the first commitment than to reschedule the second commitment.

In an implementation of this example of the eleventh aspect, the causation logic is configured to cause the digital personal assistant to provide an inquiry for the user. The inquiry requests authorization to reschedule the first commitment. In accordance with this implementation, the causation logic is configured to cause the digital personal assistant to reschedule the first commitment further in response to receipt of a response to the inquiry. The response indicates that the authorization is granted to reschedule the first commitment.

In a twelfth aspect of the first example system, the first example system further comprises determination logic configured to determine that the user is signed-in with a first account of the plurality of accounts. In accordance with the twelfth aspect, the causation logic is configured to cause the digital personal assistant to provide an inquiry for the user. The inquiry requests authorization to sign-in the user to one or more second accounts of the plurality of accounts. In further accordance with the twelfth aspect, the causation logic is configured to cause the digital personal assistant to sign-in the user to the one or more second accounts based on at least a response to the inquiry indicating that the authorization is granted to sign-in the user to the one or more second accounts. The twelfth aspect of the first example system may be implemented in combination with the first, second, third, fourth, fifth, sixth, seventh, eighth, ninth, tenth, and/or eleventh aspect of the first example system, though the example embodiments are not limited in this respect.

In a thirteenth aspect of the first example system, the causation logic is configured to cause the digital personal assistant to provide an inquiry for the user. The inquiry indicates at least one data source that is associated with a first account of the plurality of accounts. The inquiry requests authorization to include first content from the at least one data source in the content stream that is associated with the first account. In accordance with the thirteenth aspect, the combination logic is configured to selectively include the first content in the selectively combined content stream based on at least a response to the inquiry indicating that the authorization is granted to include the first content from the at least one data source in the content stream that is associated with the first account. The thirteenth aspect of the first example system may be implemented in combination with the first, second, third, fourth, fifth, sixth, seventh, eighth, ninth, tenth, eleventh, and/or twelfth aspect of the first example system, though the example embodiments are not limited in this respect.

In a fourteenth aspect of the first example system, the combination logic is configured to not include designated content in the selectively combined content stream based at least in part on a privacy policy indicating that the designated content is not to be included in the selectively combined content stream when the user is in the context. The fourteenth aspect of the first example system may be implemented in combination with the first, second, third, fourth, fifth, sixth, seventh, eighth, ninth, tenth, eleventh, twelfth, and/or thirteenth aspect of the first example system, though the example embodiments are not limited in this respect.

In a fifteenth aspect of the first example system, a privacy policy indicates that a third-party is authorized to view a portion of the selectively combined content stream. In accordance with the fifteenth aspect, the privacy policy indicates that the third-party is not authorized to view designated content that is included in the selectively combined content stream. In further accordance with the fifteenth aspect, the causation logic causes the portion of the selectively combined content stream and not the designated content to be viewable by the third-party based at least in part on the privacy policy indicating that the third party is authorized to view the portion and that the third-party is not authorized to view the designated content. The fifteenth aspect of the first example system may be implemented in combination with the first, second, third, fourth, fifth, sixth, seventh, eighth, ninth, tenth, eleventh, twelfth, thirteenth, and/or fourteenth aspect of the first example system, though the example embodiments are not limited in this respect.

A second example system to implement a context-aware digital personal assistant that supports multiple accounts comprises at least one element comprising at least one of (a) a processor, (b) hardware logic, or (c) electrical circuitry. The second example system further comprises determination logic, implemented using the at least one element, configured to determine that a plurality of users who are signed-in with a plurality of accounts of the digital personal assistant share a shared user experience provided by the digital personal assistant. The second example system further comprises combination logic, implemented using the at least one element, configured to selectively combine content from a plurality of content streams that are associated with the plurality of respective accounts based on at least a context of one or more users of the plurality of users to generate a selectively combined content stream. The second example system further comprises causation logic, implemented using the at least one element, configured to cause the digital personal assistant to provide the selectively combined content stream for presentation to the plurality of users in the shared user experience.

In a first aspect of the second example system, the combination logic is configured to include information regarding a scheduled event of a first user of the plurality of users in the selectively combined content stream in response to receipt of a request from a second user of the plurality of users regarding the scheduled event of the first user.

In an example of the first aspect of the second example system, the determination logic is further configured to determine that the request is from the second user based on at least stored information that identifies an attribute of the second user matching a detected attribute of the second user.

In another example of the first aspect of the second example system, the determination logic is further configured to check a privacy policy, which distinguishes between first information that is authorized to be included in the selectively combined content stream and second information that is not authorized to be included in the selectively combined content stream, to determine that the information regarding the scheduled event of the first user is included in the first information. In accordance with this example, the combination logic is configured to include the information regarding the scheduled event of the first user in the selectively combined content stream further in response to a determination that the information regarding the scheduled event of the first user is included in the first information.

In a second aspect of the second example system, a plurality of instances of user-specific information is associated with the plurality of respective users. In accordance with the second aspect, the determination logic is configured to determine that a request that requests the user-specific information is received from a first user of the plurality of users based on at least stored information that identifies an attribute of the first user matching a detected attribute of the first user. In further accordance with the second aspect, the combination logic is configured to include the instance of the user-specific information that is associated with the first user in the selectively combined content stream in response to a determination that the request is from the first user. The second aspect of the second example system may be implemented in combination with the first aspect of the second example system, though the example embodiments are not limited in this respect.

In a third aspect of the second example system, the determination logic is configured to determine that the plurality of users share the shared user experience provided by the digital personal assistant at a shared computing device. In accordance with the third aspect, the causation logic is configured to cause the digital personal assistant to provide the selectively combined content stream for presentation to the plurality of users in the shared user experience at the shared computing device. The third aspect of the second example system may be implemented in combination with the first and/or second aspect of the second example system, though the example embodiments are not limited in this respect.

In a fourth aspect of the second example system, each account of the digital personal assistant is associated with one or more respective content sources. In accordance with the fourth aspect, the determination logic is configured to determine that a first user who is signed-in with a first account of the plurality of accounts authorizes first content from one or more first content sources with which the first account is associated to be included in the selectively combined content stream and does not authorize second content from one or more second content sources with which the first account is associated to be included in the selectively combined content stream. In further accordance with the fourth aspect, the combination logic is configured to selectively include the first content but not the second content in the selectively combined content stream based on at least the context of the one or more users in response to a determination that the first user authorizes the first content to be included in the selectively combined content stream and does not authorize the second content to be included in the selectively combined content stream. The fourth aspect of the second example system may be implemented in combination with the first, second, and/or third aspect of the second example system, though the example embodiments are not limited in this respect.

A third example system to facilitate interaction among digital personal assistants comprises at least one element comprising at least one of (a) a processor, (b) hardware logic, or (c) electrical circuitry. The third example system further comprises determination logic, implemented using the at least one element, configured to determine whether a first digital personal assistant associated with a first user is authorized to perform an operation on behalf of a second digital personal assistant associated with a second user who is different from the first user. The second digital personal assistant is different from the first digital personal assistant. The third example system further comprises causation logic, implemented using the at least one element, configured to cause the first digital personal assistant to perform the operation on behalf of the second digital personal assistant in response to a determination that the first digital personal assistant is authorized to perform the operation on behalf of the second digital personal assistant.

In a first aspect of the third example system, the causation logic is configured to cause the first digital personal assistant to perform the operation on behalf of the second digital personal assistant based on at least a context of the second user.

In an example of the first aspect of the third example system, the causation logic is configured to cause the first digital personal assistant to perform the operation on behalf of the second digital personal assistant based on at least the second user being proximate a designated location.

In another example of the first aspect of the third example system, the causation logic is configured to cause the first digital personal assistant to perform the operation on behalf of the second digital personal assistant based on at least information conveyed in a conversation of the second user.

In yet another example of the first aspect of the third example system, the causation logic is configured to cause the first digital personal assistant to perform the operation on behalf of the second digital personal assistant based on at least a scheduled event of the second user being scheduled to occur within a threshold duration of time from a current time.

In still another example of the first aspect of the third example system, the causation logic is configured to cause the first digital personal assistant to perform the operation on behalf of the second digital personal assistant based on at least an interaction pattern of the second user with at least one of (a) one or more applications or (b) one or more services.

In another example of the first aspect of the third example system, the causation logic is configured to cause the first digital personal assistant to perform the operation on behalf of the second digital personal assistant based on at least the second user being in a presence of one or more specified users.

In yet another example of the first aspect of the third example system, the causation logic is configured to cause the first digital personal assistant to perform the operation on behalf of the second digital personal assistant based on at least one of a search history of the second user, a browse history of the second user, or a habit of the second user.

In still another example of the first aspect of the third example system, the second user is signed-in with a plurality of accounts of the second digital personal assistant. The plurality of accounts includes at least a first account and a second account. In accordance with this example, the causation logic is configured to cause the first digital personal assistant to perform the operation on behalf of the second digital personal assistant based on at least the second user changing from a first context associated with the first account to a second context associated with the second account.

A fourth example system to facilitate interaction among digital personal assistants comprises at least one element comprising at least one of (a) a processor, (b) hardware logic, or (c) electrical circuitry. The fourth example system further comprises determination logic, implemented using the at least one element, configured to determine whether a first digital personal assistant associated with a first user is authorized to delegate an operation to a second digital personal assistant associated with a second user who is different from the first user. The second digital personal assistant is different from the first digital personal assistant. The fourth example system further comprises causation logic, implemented using the at least one element, configured to cause the first digital personal assistant to cause the first digital personal assistant to delegate the operation to the second digital personal assistant in response to a determination that the first digital personal assistant is authorized to delegate the operation to the second digital personal assistant.

In a first aspect of the fourth example system, the causation logic is configured to cause the first digital personal assistant to cause the first digital personal assistant to delegate the operation to the second digital personal assistant based on at least a context of the second user.

In an example of the first aspect of the fourth example system, the causation logic is configured to cause the first digital personal assistant to cause the first digital personal assistant to delegate the operation to the second digital personal assistant based on at least a location of the second user.

In another example of the first aspect of the fourth example system, the causation logic is configured to cause the first digital personal assistant to cause the first digital personal assistant to delegate the operation to the second digital personal assistant based on at least communication associated with the second user.

In yet another example of the first aspect of the fourth example system, the causation logic is configured to cause the first digital personal assistant to cause the first digital personal assistant to delegate the operation to the second digital personal assistant based on at least a scheduled event of the second user.

In still another example of the first aspect of the fourth example system, the causation logic is configured to cause the first digital personal assistant to cause the first digital personal assistant to delegate the operation to the second digital personal assistant based on at least one of an interaction pattern of the second user or a habit of the second user.

In another example of the first aspect of the fourth example system, the causation logic is configured to cause the first digital personal assistant to cause the first digital personal assistant to delegate the operation to the second digital personal assistant based on at least the second user being within a specified proximity to one or more specified users.

In yet another example of the first aspect of the fourth example system, the causation logic is configured to cause the first digital personal assistant to cause the first digital personal assistant to delegate the operation to the second digital personal assistant based on at least one or more applications that are opened by the second user.

In still another example of the first aspect of the fourth example system, the causation logic is configured to cause the first digital personal assistant to cause the first digital personal assistant to delegate the operation to the second digital personal assistant based on at least one of a search history of the second user or a browse history of the second user.

In another example of the first aspect of the fourth example system, the second user is signed-in with a plurality of accounts of the second digital personal assistant. The plurality of accounts includes at least a first account and a second account. In accordance with this example, the causation logic is configured to cause the first digital personal assistant to cause the first digital personal assistant to delegate the operation to the second digital personal assistant based on at least the second user changing from a first context associated with the first account to a second context associated with the second account.

A first example computer program product comprises a computer-readable storage medium having computer program logic recorded thereon for enabling a processor-based system to implement a context-aware digital personal assistant that supports multiple accounts. The computer program logic comprises first program logic for enabling the processor-based system to selectively combine content from a plurality of content streams that are associated with a plurality of respective accounts of the digital personal assistant based on at least a context of a user who is signed-in with the plurality of accounts to generate a selectively combined content stream. The computer program logic further comprises second program logic for enabling the processor-based system to cause the digital personal assistant to provide the selectively combined content stream for presentation to the user.

A second example computer program product comprises a computer-readable storage medium having computer program logic recorded thereon for enabling a processor-based system to implement a context-aware digital personal assistant that supports multiple accounts. The computer program logic comprises first program logic for enabling the processor-based system to determine that a plurality of users who are signed-in with a plurality of accounts of the digital personal assistant share a shared user experience provided by the digital personal assistant. The computer program logic further comprises second program logic for enabling the processor-based system to selectively combine content from a plurality of content streams that are associated with the plurality of respective accounts based on at least a context of one or more users of the plurality of users to generate a selectively combined content stream. The computer program logic further comprises third program logic for enabling the processor-based system to cause the digital personal assistant to provide the selectively combined content stream for presentation to the plurality of users in the shared user experience.

A third example computer program product comprises a computer-readable storage medium having computer program logic recorded thereon for enabling a processor-based system to facilitate interaction among digital personal assistants. The computer program logic comprises first program logic for enabling the processor-based system to determine whether a first digital personal assistant associated with a first user is authorized to perform an operation on behalf of a second digital personal assistant associated with a second user who is different from the first user. The second digital personal assistant is different from the first digital personal assistant. The computer program logic further comprises second program logic for enabling the processor-based system to cause the first digital personal assistant to perform the operation on behalf of the second digital personal assistant in response to a determination that the first digital personal assistant is authorized to perform the operation on behalf of the second digital personal assistant.

A fourth example computer program product comprises a computer-readable storage medium having computer program logic recorded thereon for enabling a processor-based system to facilitate interaction among digital personal assistants. The computer program logic comprises first program logic for enabling the processor-based system to determine whether a first digital personal assistant associated with a first user is authorized to delegate an operation to a second digital personal assistant associated with a second user who is different from the first user. The second digital personal assistant is different from the first digital personal assistant. The computer program logic further comprises second program logic for enabling the processor-based system to cause the first digital personal assistant to cause the first digital personal assistant to delegate the operation to the second digital personal assistant in response to a determination that the first digital personal assistant is authorized to delegate the operation to the second digital personal assistant.

IV. Example Computer System

Figure 13:
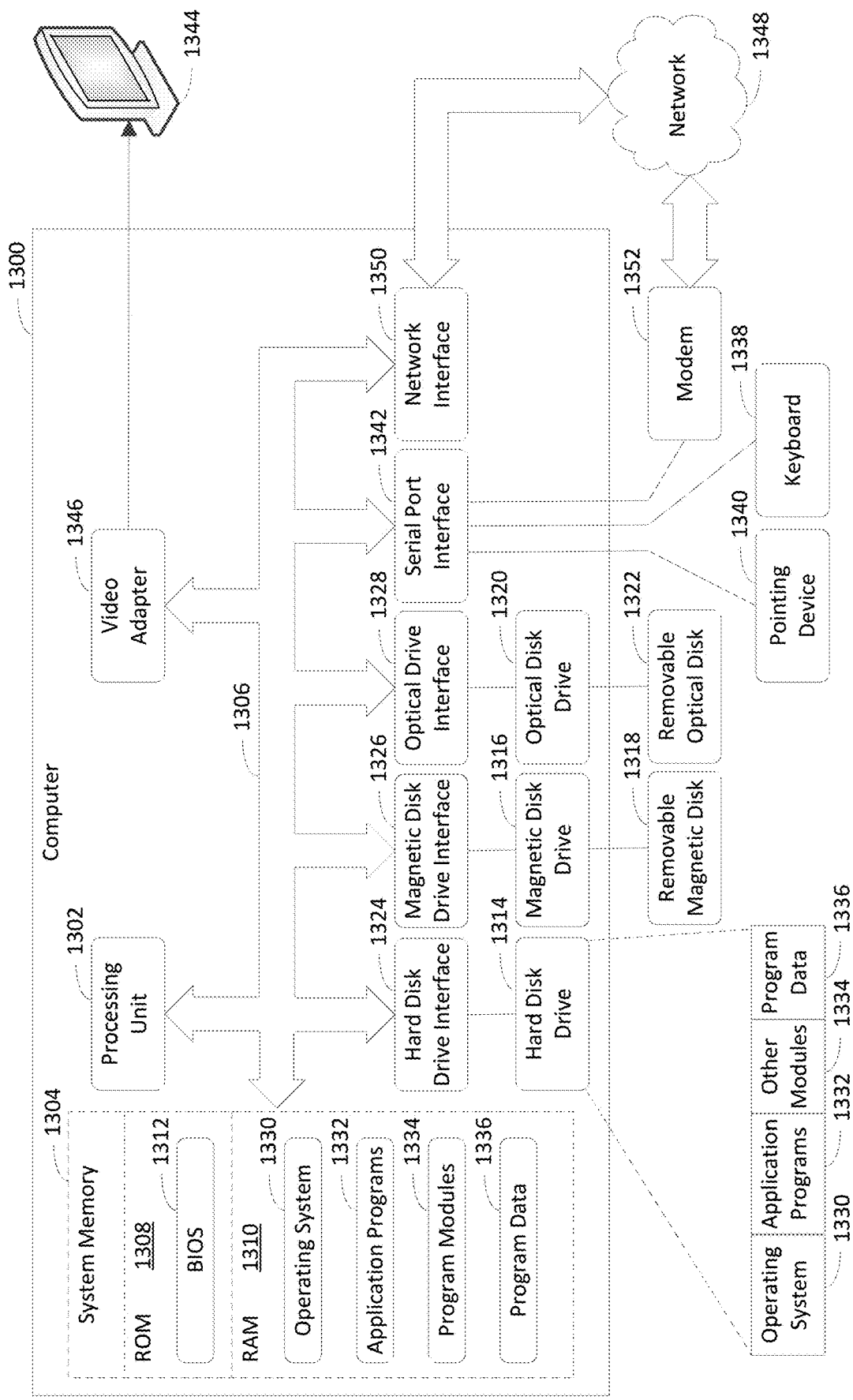
FIG. 13 depicts an example computer in which embodiments may be implemented.

FIG. 13 depicts an example computer 1300 in which embodiments may be implemented. For instance, any one or more of user devices 102A-102M and/or any one or more of servers 106A-106N shown in FIG. 1 and/or computing system 1200 shown in FIG. 12 may be implemented using computer 1300, including one or more features of computer 1300 and/or alternative features. Computer 1300 may be a general-purpose computing device in the form of a conventional personal computer, a mobile computer, or a workstation, for example, or computer 1300 may be a special purpose computing device. The description of computer 1300 provided herein is provided for purposes of illustration, and is not intended to be limiting. Embodiments may be implemented in further types of computer systems, as would be known to persons skilled in the relevant art(s).

As shown in FIG. 13, computer 1300 includes a processing unit 1302, a system memory 1304, and a bus 1306 that couples various system components including system memory 1304 to processing unit 1302. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computer 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1330, one or more application programs 1332, other program modules 1334, and program data 1336. Application programs 1332 or program modules 1334 may include, for example, computer program logic for implementing any one or more of digital personal assistants 108A-108M, context-aware assistant logic 110, context-aware assistant logic 1202, determination logic 1206, combination logic 1208, causation logic 1210, assignment logic 1212, selection logic 1214, flowchart 200 (including any step of flowchart 200), flowchart 300 (including any step of flowchart 300), flowchart 400 (including any step of flowchart 400), flowchart 500 (including any step of flowchart 500), flowchart 600 (including any step of flowchart 600), flowchart 700 (including any step of flowchart 700), flowchart 800 (including any step of flowchart 800), flowchart 900 (including any step of flowchart 900), flowchart 1000 (including any step of flowchart 1000), flowchart 1100 (including any step of flowchart 1100), and/or flowchart 1150 (including any step of flowchart 1150), as described herein.

A user may enter commands and information into the computer 1300 through input devices such as keyboard 1338 and pointing device 1340. Other input devices (not shown) may include a microphone, joystick, game pad, satellite dish, scanner, touch screen, camera, accelerometer, gyroscope, or the like. These and other input devices are often connected to the processing unit 1302 through a serial port interface 1342 that is coupled to bus 1306, but may be connected by other interfaces, such as a parallel port, game port, or a universal serial bus (USB).

A display device 1344 (e.g., a monitor) is also connected to bus 1306 via an interface, such as a video adapter 1346. In addition to display device 1344, computer 1300 may include other peripheral output devices (not shown) such as speakers and printers.

Computer 1300 is connected to a network 1348 (e.g., the Internet) through a network interface or adapter 1350, a modem 1352, or other means for establishing communications over the network. Modem 1352, which may be internal or external, is connected to bus 1306 via serial port interface 1342.

As used herein, the terms "computer program medium" and "computer-readable storage medium" are used to generally refer to media (e.g., non-transitory media) such as the hard disk associated with hard disk drive 1314, removable magnetic disk 1318, removable optical disk 1322, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1332 and other program modules 1334) may be stored on the hard disk, magnetic disk, optical disk, ROM, or RAM. Such computer programs may also be received via network interface 1350 or serial port interface 1342. Such computer programs, when executed or loaded by an application, enable computer 1300 to implement features of embodiments discussed herein. Accordingly, such computer programs represent controllers of the computer 1300.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technology is not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to implement a context-aware digital personal assistant application program having multiple accounts, the system comprising:
   a memory; and
   one or more processors coupled to the memory, the one or more processors configured to:
      determine to which of multiple accounts of a common digital personal assistant application program a user is signed-in;
      selectively combine content from a plurality of content streams that are associated with a plurality of respective accounts of the common digital personal assistant application program to which the user is signed-in based on at least a determination to which of the multiple accounts of the common digital personal assistant application program the user is signed-in and further based on at least a context of the user who is signed-in with the plurality of accounts of the common digital personal assistant application program to generate a selectively combined content stream, wherein each of the plurality of accounts of the common digital personal assistant application program is associated with one or more preferences of the user that indicate which content the common digital personal assistant application program selectively includes in the respective content stream that is associated with the respective account; and
      cause the common digital personal assistant application program to provide the selectively combined content stream for presentation to the user.

2. The system of claim 1, wherein one or more first content streams of the plurality of content streams are associated with one or more respective first accounts of the plurality of accounts;
   wherein one or more second content streams of the plurality of content streams are associated with one or more respective second accounts of the plurality of accounts; and
   wherein the one or more processors are configured to:
      determine whether the context of the user changes from a first context to a second context;
      assign a first relevance weight to first content from the one or more first content streams in response to a determination that the context of the user changes from the first context to the second context;
      assign a second relevance weight to second content from the one or more second content streams in response to the determination that the context of the user changes from the first context to the second context, the second relevance weight being greater than the first relevance weight; and
      selectively include the first content and the second content in the selectively combined content stream based on at least the first relevance weight and the second relevance weight.

3. The system of claim 1, wherein the context of the user is a work context associated with work of the user; and
   wherein the one or more processors are configured to:
      assign a first relevance weight to first content that is associated with the work of the user from the plurality of content streams;
      assign a second relevance weight to second content that is not associated with the work of the user from the plurality of content streams, the first relevance weight being greater than the second relevance weight; and
      selectively include the first content and the second content in the selectively combined content stream based on at least the first relevance weight and the second relevance weight.

4. The system of claim 1, wherein the one or more processors are configured to:
   determine whether the context of the user is to change from a first context to a second context based on whether one or more criteria are satisfied; and
   cause the common digital personal assistant application program to provide a notification to the user regarding the first context or the second context in response to a determination that the context of the user is to change from the first context to the second context.

5. The system of claim 1, wherein the plurality of accounts includes a plurality of work accounts that are associated with a plurality of respective attributes associated with work of the user, the plurality of work accounts including at least a first work account and a second work account; and
   wherein the one or more processors are configured to selectively combine first content from a first work-related content stream associated with the first work account and second content from a second work-related content stream associated with the second work account based on at least the context of the user to generate the selectively combined content stream.

6. The system of claim 1, wherein the plurality of accounts includes a plurality of personal accounts that are associated with a plurality of respective attributes associated with a personal life of the user, the plurality of personal accounts including at least a first personal account and a second personal account; and
   wherein the one or more processors are configured to selectively combine first content from a first content stream associated with the first personal account and second content from a second content stream associated with the second personal account based on at least the context of the user to generate the selectively combined content stream.

7. The system of claim 1, wherein the user has a first type of relationship with a specified person in a first context of the user;
   wherein the user has a second type of relationship with the specified person that is different from the first type in a second context of the user; and
   wherein the one or more processors are configured to select between a first manner and a second manner in which to communicate with the specified person on behalf of the user depending on whether the context of the user is the first context or the second context, the first manner corresponding to the context of the user being the first context, the second manner corresponding to the context of the user being the second context.

8. The system of claim 1, wherein the plurality of content streams includes at least a first content stream, a second content stream, and a third content stream associated with a first account, a second account, and a third account, respectively, of the plurality of accounts; and
   wherein the one or more processors are configured to selectively combine the content (a) from at least the first and second content streams and not from the third content stream or (b) from at least the first and third content streams and not from the second content stream depending on whether the context of the user is a first context or a second context, the first context corresponding to the content being selected from at least the first and second content streams and not from the third content stream, the second context corresponding to the content being selected from at least the first and third content streams and not from the second content stream.

9. The system of claim 1, wherein the one or more processors are configured to:
   determine that the user accesses the common digital personal assistant application program via a first device of a plurality of devices that are associated with the user;
   determine that a first content stream associated with a first account is not accessible via the first device, the first content stream is included in the plurality of content streams, the first account is included in the plurality of accounts;
   determine that the first content stream is accessible via a second device of the plurality of devices; and
   cause the common digital personal assistant application program to notify the user that the first content stream is accessible via the second device in response to a determination that the first content stream is not accessible via the first device and further in response to a determination that the first content stream is accessible via the second device.

10. The system of claim 1, wherein the one or more processors are configured to:
    determine that a first content stream associated with a first account is not accessible while the user is in the first context, the first content stream is included in the plurality of content streams, the first account is included in the plurality of accounts; and
    cause the common digital personal assistant application program to notify the user that the first content stream is not accessible while the user is in the first context in response to a determination that the first content stream is not accessible while the user is in the first context.

11. The system of claim 1, wherein the one or more processors are configured to:
    determine that the user has a first commitment scheduled in a first account of the plurality of accounts;
    determine that the user has a second commitment scheduled in a second account of the plurality of accounts, the second commitment overlapping in time with the first commitment; and
    cause the common digital personal assistant application program to reschedule the first commitment in the first account to accommodate the second commitment in the second account.

12. The system of claim 11, wherein the one or more processors are configured to:
    determine that the user is more likely to reschedule the first commitment than to reschedule the second commitment based on at least one of historical information or a preference associated with the user; and
    cause the common digital personal assistant application program to reschedule the first commitment in response to a determination that the user is more likely to reschedule the first commitment than to reschedule the second commitment.

13. The system of claim 1, wherein the one or more processors are configured to:
    determine that the user is signed-in with a first account of the multiple accounts;
    cause the common digital personal assistant application program to provide an inquiry for the user, the inquiry requesting authorization to sign-in the user to one or more second accounts of the multiple accounts; and
    cause the common digital personal assistant application program to sign-in the user to the one or more second accounts based on at least a response to the inquiry indicating that the authorization is granted to sign-in the user to the one or more second accounts.

14. The system of claim 1, wherein the one or more processors are configured to:
    cause the common digital personal assistant application program to provide an inquiry for the user, the inquiry indicating at least one data source that is associated with a first account of the plurality of accounts, the inquiry requesting authorization to include first content from the at least one data source in the content stream that is associated with the first account; and
    selectively include the first content in the selectively combined content stream based on at least a response to the inquiry indicating that the authorization is granted to include the first content from the at least one data source in the content stream that is associated with the first account.

15. The system of claim 1, wherein the one or more processors are configured to:
    not include designated content in the selectively combined content stream based at least in part on a privacy policy indicating that the designated content is not to be included in the selectively combined content stream when the user is in the context.

16. The system of claim 1, wherein a privacy policy indicates that a third-party is authorized to view a portion of the selectively combined content stream;
    wherein the privacy policy indicates that the third-party is not authorized to view designated content that is included in the selectively combined content stream; and
    wherein the one or more processors are configured to cause the portion of the selectively combined content stream and not the designated content to be viewable by the third-party based at least in part on the privacy policy indicating that the third party is authorized to view the portion and that the third-party is not authorized to view the designated content.

17. A system to implement a context-aware digital personal assistant that supports multiple accounts, the system comprising:
a memory; and
one or more processors coupled to the memory, the one or more processors configured to:
determine that a plurality of users who are signed-in with a plurality of accounts of the digital personal assistant share a shared user experience provided by the digital personal assistant;
selectively combine content from a plurality of content streams that are associated with the plurality of respective accounts with which the plurality of respective users are signed-in based on at least the plurality of users being simultaneously signed-in with the plurality of respective accounts and further based on at least a context of one or more users of the plurality of users to generate a selectively combined content stream such that information regarding a scheduled event of a first user of the plurality of users is included in the selectively combined content stream in response to receipt of a request from a second user of the plurality of users regarding the scheduled event of the first user; and
cause the digital personal assistant to provide the selectively combined content stream for presentation to the plurality of users in the shared user experience.

18. The system of claim 17, wherein the one or more processors are configured to:
check a privacy policy, which distinguishes between first information that is authorized to be included in the selectively combined content stream and second information that is not authorized to be included in the selectively combined content stream, to determine that the information regarding the scheduled event of the first user is included in the first information; and
include the information regarding the scheduled event of the first user in the selectively combined content stream further in response to a determination that the information regarding the scheduled event of the first user is included in the first information.

19. The system of claim 17, wherein a plurality of instances of user-specific information is associated with the plurality of respective users; and
wherein the one or more processors are configured to:
determine that a request that requests the user-specific information is received from a first user of the plurality of users based on at least stored information that identifies an attribute of the first user matching a detected attribute of the first user; and
include the instance of the user-specific information that is associated with the first user in the selectively combined content stream in response to a determination that the request is from the first user.

20. The system of claim 17, wherein the one or more processors are configured to:
determine that the plurality of users share the unified user experience provided by the digital personal assistant at a shared computing device; and
cause the digital personal assistant to provide the selectively combined content stream for presentation to the plurality of users in the unified user experience at the shared computing device.

21. The system of claim 17, wherein each account of the digital personal assistant is associated with one or more respective content sources; and
wherein the one or more processors are configured to:
determine that a first user who is signed-in with a first account of the plurality of accounts authorizes first content from one or more first content sources with which the first account is associated to be included in the selectively combined content stream and does not authorize second content from one or more second content sources with which the first account is associated to be included in the selectively combined content stream; and
selectively include the first content but not the second content in the selectively combined content stream based on at least the context of the one or more users in response to a determination that the first user authorizes the first content to be included in the selectively combined content stream and does not authorize the second content to be included in the selectively combined content stream.

22. The system of claim 17, wherein the one or more processors are configured to:
include the information regarding the scheduled event of the first user in the selectively combined content stream by extracting the information from a calendar entry of the first user that is associated with the scheduled event.

23. A method of implementing a context-aware digital personal assistant application program having multiple accounts using one or more processors of a processor-based system, the method comprising:
determining to which of multiple accounts of a common digital personal assistant application program a user is signed-in;
selectively combining content from a plurality of content streams that are associated with the plurality of respective accounts of the common digital personal assistant application program to which the user is signed-in based on at least a determination to which of the multiple accounts of the common digital personal assistant application program the user is signed-in and further based on at least a context of the user who is signed-in with the plurality of accounts of the common digital personal assistant application program to generate a selectively combined content stream, wherein each of the plurality of accounts of the common digital personal assistant application program is associated with one or more preferences of the user that indicate which content the common digital personal assistant application program selectively includes in the respective content stream that is associated with the respective account; and
causing the common digital personal assistant application program to provide the selectively combined content stream for presentation to the user.

* * * * *